(12) United States Patent
Xiong et al.

(10) Patent No.: US 10,390,236 B2
(45) Date of Patent: Aug. 20, 2019

(54) SYSTEMS, METHODS AND DEVICES FOR UPLINK TRANSMISSIONS WITH REDUCED SIGNALING OVERHEAD

(71) Applicant: INTEL IP CORPORATION, Santa Clara, CA (US)

(72) Inventors: Gang Xiong, Beaverton, OR (US); Debdeep Chatterjee, Mountain View, CA (US); Seunghee Han, San Jose, CA (US); Jong-Kae Fwu, Sunnyvale, CA (US); Hwan-Joon Kwon, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 16 days.

(21) Appl. No.: 15/546,257

(22) PCT Filed: Sep. 22, 2015

(86) PCT No.: PCT/US2015/051432
§ 371 (c)(1),
(2) Date: Jul. 25, 2017

(87) PCT Pub. No.: WO2016/153548
PCT Pub. Date: Sep. 29, 2016

(65) Prior Publication Data
US 2018/0020365 A1    Jan. 18, 2018

Related U.S. Application Data

(60) Provisional application No. 62/138,635, filed on Mar. 26, 2015.

(51) Int. Cl.
*H04W 24/02* (2009.01)
*H04W 74/08* (2009.01)
*H04W 4/70* (2018.01)
(Continued)

(52) U.S. Cl.
CPC ............. *H04W 24/02* (2013.01); *H04W 4/70* (2018.02); *H04W 28/06* (2013.01); *H04W 72/04* (2013.01);
(Continued)

(58) Field of Classification Search
None
See application file for complete search history.

(56) References Cited

U.S. PATENT DOCUMENTS

| | | |
|---|---|---|
| 2011/0274040 A1 | 11/2011 | Pani et al. |
| 2012/0044878 A1 | 2/2012 | Ratasuk et al. |

(Continued)

FOREIGN PATENT DOCUMENTS

| | | |
|---|---|---|
| JP | 2013520103 A | 8/2011 |
| JP | 2013501463 A | 1/2013 |

(Continued)

OTHER PUBLICATIONS

PCT/US2015/051432, International Search Report and Written Opinion, dated Dec. 21, 2015, 13 pages.

*Primary Examiner* — Diane L Lo
(74) *Attorney, Agent, or Firm* — Stoel Rives LLP

(57) ABSTRACT

Techniques, apparatus and methods are disclosed that enable reduced signaling overhead in a fifth generation (5G) wireless system. The system includes support for asynchronous uplink transmission, resource pool configuration, acknowledgement response and retransmission. For example, in a Type-1 transmission scheme, a user equipment (UE) selects one resource within the resource pool and transmits data in the uplink on the selected resource. In a Type-2 transmission scheme, a UE selects one resource within a scheduling request (SR) region in the resource pool, transmits the SR for the resource which contains the resource allocation for data transmission, and transmits the uplink data on the (Continued)

resource which is indicated in the SR information. In a Type-3 transmission scheme, a UE selects a resource within the SR region, transmits the SR on the selected resource with information on the resource selected for subsequent data transmission and transmits on the indicated resource if it receives an acknowledgment, in response to its transmitted SR.

24 Claims, 13 Drawing Sheets

(51) Int. Cl.
  *H04W 28/06*   (2009.01)
  *H04W 72/04*   (2009.01)
  *H04W 72/12*   (2009.01)
  *H04W 88/02*   (2009.01)

(52) U.S. Cl.
  CPC ... *H04W 72/1278* (2013.01); *H04W 74/0833* (2013.01); *H04W 88/02* (2013.01); *H04W 74/0883* (2013.01)

(56) References Cited

U.S. PATENT DOCUMENTS

| | | | |
|---|---|---|---|
| 2013/0182623 A1 | 7/2013 | Fan et al. | |
| 2014/0064159 A1* | 3/2014 | Larsson | H04L 1/1607 370/280 |
| 2015/0023281 A1 | 1/2015 | Wu | |
| 2016/0157254 A1* | 6/2016 | Novlan | H04W 76/14 370/329 |
| 2016/0270053 A1* | 9/2016 | Zeng | H04W 2/048 |
| 2017/0055280 A1* | 2/2017 | Kim | H04W 72/0406 |

FOREIGN PATENT DOCUMENTS

| | | |
|---|---|---|
| JP | 2015522970 A | 8/2015 |
| JP | 2016528791 A | 9/2016 |
| WO | 2013169166 A1 | 11/2013 |
| WO | 2015005701 A1 | 1/2015 |

\* cited by examiner

Example UE

SYSTEMS, METHODS AND DEVICES FOR UPLINK TRANSMISSIONS WITH REDUCED SIGNALING OVERHEAD

RELATED APPLICATION

This application is a national phase application of International Patent Application No. PCT/US2015/051432, filed Sep. 22, 2015, which claims the benefit under 35 U.S.C. § 119(e) of U.S. Provisional Application No. 62/138,635 filed Mar. 26, 2015, both of which are incorporated by reference herein in their entirety.

TECHNICAL FIELD

The present disclosure relates to wireless device communication systems and more specifically relates to reduced signaling overhead in a fifth generation (5G) wireless system.

DETAILED DESCRIPTION OF PREFERRED EMBODIMENTS

Figure 1:
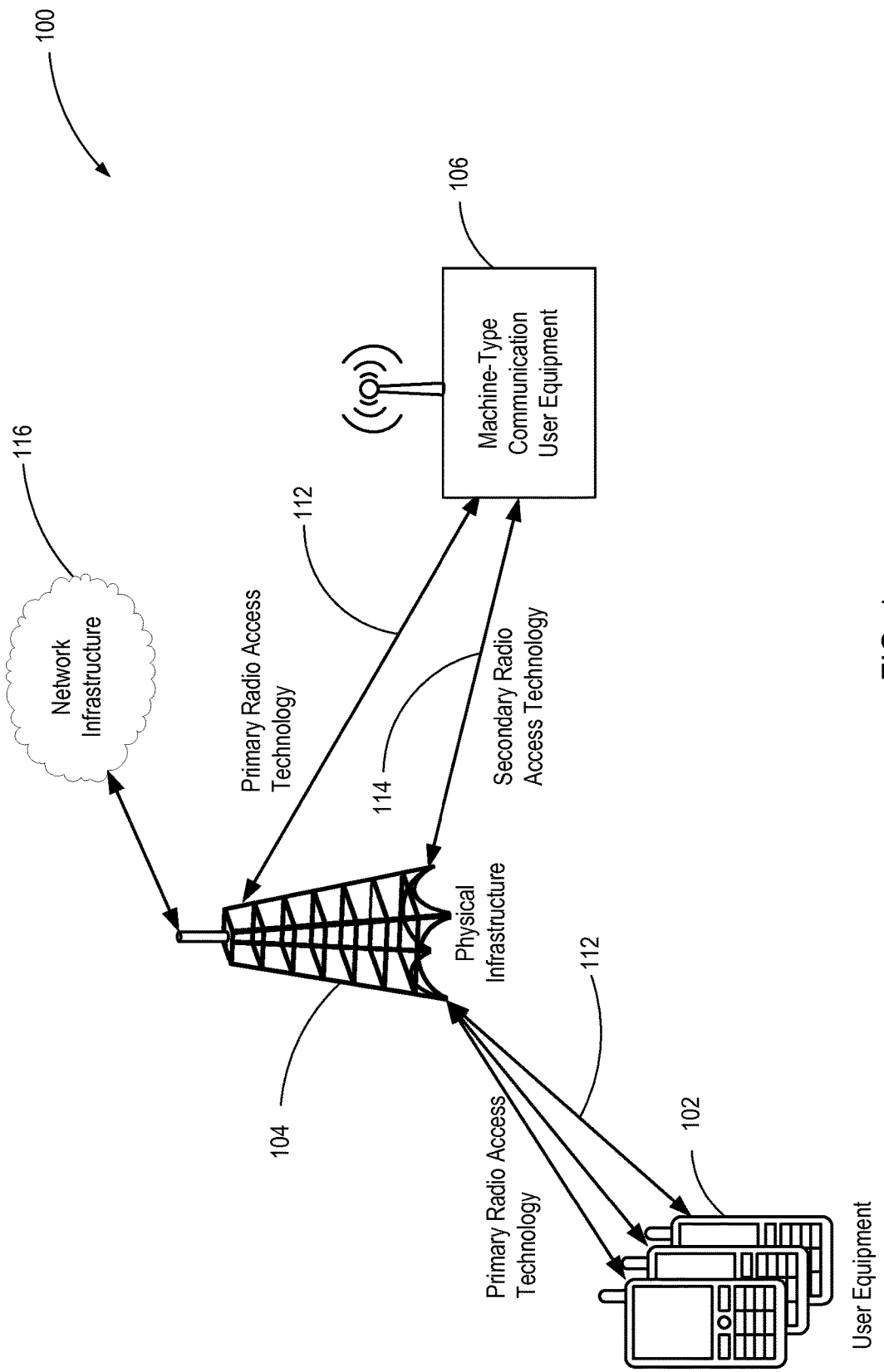
FIG. 1 is a system diagram illustrating a system for radio access technology coordination consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable reduced signaling overhead in a fifth generation (5G) wireless system. The reduced signaling overhead includes mechanisms to support asynchronous uplink transmission, resource pool configuration, acknowledgement response mechanisms and retransmission mechanisms in wireless communications. For example, in a Type-1 transmission scheme, a UE selects one resource within the resource pool and transmits data in the uplink on the selected resource. In a Type-2 transmission scheme, a UE selects one resource within a scheduling request (SR) region in the resource pool, transmits the SR information on the selected resource which contains the resource allocation for data transmission and transmits the uplink data on the resource which is indicated in the SR information. In a Type-3 transmission scheme, a UE selects one resource within the SR region, transmits the SR on the selected resource with information on the resource selected for subsequent data transmission and transmits on the indicated resource if it receives an acknowledgement (ACK), in response to its transmitted SR.

Machine-Type Communication (MTC) is a promising and emerging technology to enable a ubiquitous computing environment toward the concept of "Internet of Things" (IoT). Potential MTC-based applications include smart metering, healthcare monitoring, remote security surveillance, intelligent transportation system, etc. These services and applications stimulate the design and development of a new type of MTC device that needs to be seamlessly integrated into current and next generation mobile broadband networks such as long term evolution (LTE) and LTE-Advanced.

The existing mobile broadband networks were designed to optimize performance mainly for human type of communications and thus are not designed or optimized to meet the MTC-related requirements. MTC-specific designs are being studied by Third Generation Partnership Project (3GPP) Radio Access Network (RAN) working groups (WGs) for specification support in Release-13 LTE specifications, wherein the primary objective is to focus on the lower device cost, enhanced coverage and reduced power consumption.

To further reduce the cost and power consumption, it may be beneficial to further reduce the system bandwidth, e.g., 200 KHz, which corresponds to roughly a single physical resource block (PRB) of existing LTE design. This so-called cellular IoT could potentially operate in repurposed (also known as re-farmed) global systems for mobile communications (GSM) spectrum, within the guard bands of an LTE carrier, or in a dedicated spectrum.

For smart metering type of MTC applications, it is expected that MTC devices communicate with eNBs with infrequent small data burst transmissions. For instance, MTC devices report the water or electricity usage once per six hours or once per day. If MTC devices follow the normal procedure to transmit the data in the uplink, they may need to first acquire uplink synchronization by transmitting physical random access channel (PRACH) signals and subsequently receive the uplink grant from eNBs. Given the fact that only a small amount of data is transmitted in the uplink for typical MTC applications compared to the large amount of overhead (PRACH, uplink grant, etc.), the current design is not efficient in terms of scalability to support a massive number of MTC devices as envisioned in the near future due to substantial signaling overhead.

To reduce signaling overhead and save network resources, the uplink transmission procedure for MTC devices should be appropriately designed. A system and method to support uplink transmission for MTC devices in 5G systems can be performed in the following ways: (1) Mechanisms for uplink transmission, including Type-1, Type-2 and Type-3 uplink transmission; (2) mechanisms to support asynchronous uplink transmission; (3) resource pool configuration for uplink transmission; (4) ACK response mechanism for uplink transmission; and/or (5) retransmission mechanism for uplink transmission.

It should be noted that embodiments discussed herein can be considered for 3GPP Release 13 (Rel-13) MTC with 1.4 MHz system bandwidth and/or future narrowband MTC design with 200 KHz, 400 KHz or 600 KHz system bandwidth, etc.

Wireless mobile communication technology uses various standards and protocols to transmit data between a base station and a wireless mobile device. Wireless communication system standards and protocols can include the 3GPP LTE; the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as UE.

FIG. 1 shows a system 100 for radio access technology coordination. Multiple UEs 102 can connect to a physical infrastructure 104 (such as eNBs, cell towers, network access points, etc.) over a primary RAT (P-RAT) 112. The physical infrastructure 104 can receive or send wireless transmissions from or to the UEs 102. Based on the transmissions, the physical infrastructure 104 can provide access to a network infrastructure 116.

The physical infrastructure 104 can also support an S-RAT 114, which is scheduled over the P-RAT 112 (or the P-RAT 112 scheduled over the S-RAT 114). A machine-type communication user equipment (MTC UE or MCE) 106 can transition from a low-power state to an active state. The P-RAT 112 and S-RAT 114 can be optimized for different attributes. In one embodiment, the P-RAT 112 is optimized for high-throughput and the S-RAT 114 is optimized for battery-conserving transmissions (e.g., low-power transmissions, infrequent transmissions, etc.). These optimizations enable a unified network/system 100 configured to meet different and sometimes conflicting performance dimensions and services.

In some embodiments, only one RAT is used, such as the P-RAT 112.

Different transmission schemes can be used to reduce transmission overhead, such as when an MTC UE 106 uses infrequent small data burst transmissions. In an embodiment of a Type-1 transmission, an MTC UE 106 randomly selects one resource within the resource pool and transmits data in the uplink on the selected resource. In an embodiment of a Type-2 transmission scheme, an MTC UE 106 randomly selects one resource within the scheduling request (SR) region in the resource pool and transmits the SR information on the selected resource which contains the resource allocation for data transmission. The MTC UE 106 then transmits the uplink data on the resource which is indicated in the SR information. In an embodiment of a Type-3 transmission scheme, an MTC UE 106 randomly selects a resource within the SR region and transmits the SR on the selected resource with information on the resource selected for subsequent data transmission. The MTC UE 106 transmits on the indicated resource if it receives an ACK, in response to its transmitted SR, granting transmission on the uplink (UL) from the eNB or base station.

It should be noted that while the above three embodiments describe scheduling and transmission over a single RAT, cross-RAT scheduling and/or transmission can also occur.

Figure 2:
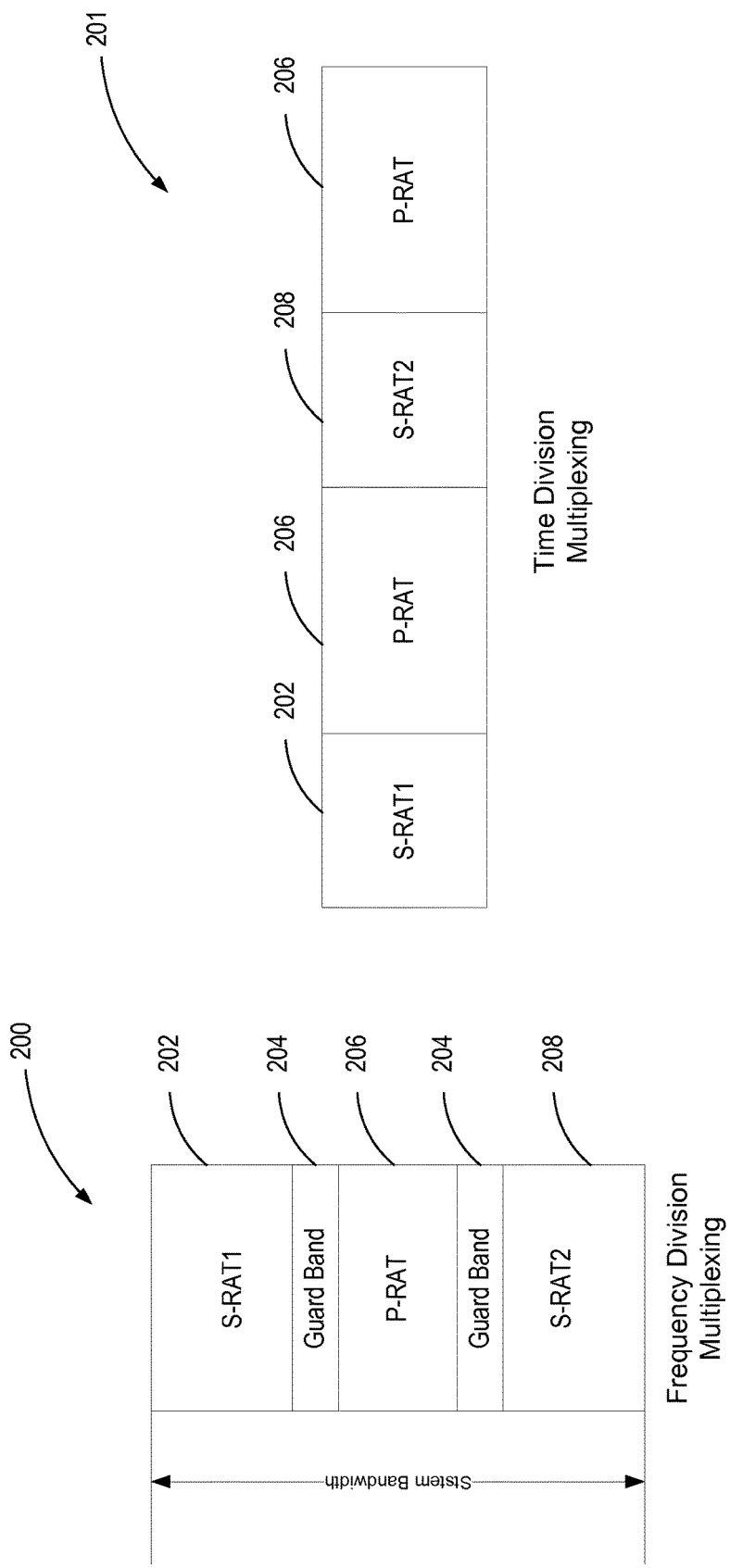
FIG. 2 is a schematic diagram illustrating multiplexing of multiple radio access technologies (RATs) consistent with embodiments disclosed herein.

FIG. 2 shows multiplexing of multiple RATs. Multiple RATs, sub-RATs or partitions with same or different numerologies can be multiplexed in time division multiplexing (TDM) 201 or frequency division multiplexing (FDM) 200 or code division multiplexing (CDM) or space division multiplexing (SDM) or a combination of above options and other possible orthogonal or non-orthogonal multiplexing. FIG. 2 illustrates the multiplexing of multiple RATs in the FDM 200 and TDM 201 manner. Note that when multiple RATs are multiplexed in the FDM manner, certain guard bands 204 may need to be inserted at the edge of frequency resources allocated for the RATs in order to minimize the inter-RAT interference.

In FIG. 2, a P-RAT 206 normally operates at a lower sampling rate in order to save UE power consumption, while an S-RAT 202 or 208 can operate at a relatively higher sampling rate to support low latency applications, e.g., mission critical applications, tactile applications or vehicular to vehicular (V2V) applications.

In other application, the S-RAT 202 or 208 can operate at a lower sampling rate to reduce the synchronization requirement of S-RAT 202 or 208, and enable a larger number of devices sharing the channel/RAT or for energy saving.

In other application, the S-RAT 202 or 208 may operate at a same sampling rate using same or different waveform(s) from P-RAT 206 to enable different applications.

Note that the P-RAT 206 and S-RAT 202 or 208 do not strictly imply to be different RATs. They may be based on the same RAT with different optimizations and use/partition for different applications, e.g., a regular partition with a carrier resource (referred to also as P-RAT) and an additional resource partition/region for device to device (D2D) or MTC application (referred to also as S-RAT).

In one example, for carrier frequency below 6 GHz, P-RAT 206 can reuse the existing LTE numerology, while S-RAT 202 or 208 can be designed to support low latency applications. In one option, S-RAT 202 or 208 can also reuse the existing LTE numerology. To support low latency applications, two to three orthogonal frequency-division multiplexing (OFDM) symbols can be grouped together to achieve about a 0.2 ms sub-transmission time interval (TTI). In another option, S-RAT 202 or 208 can be designed based on a larger subcarrier spacing than the P-RAT 208 subcarrier spacing, e.g., 75 KHz.

Figure 3:
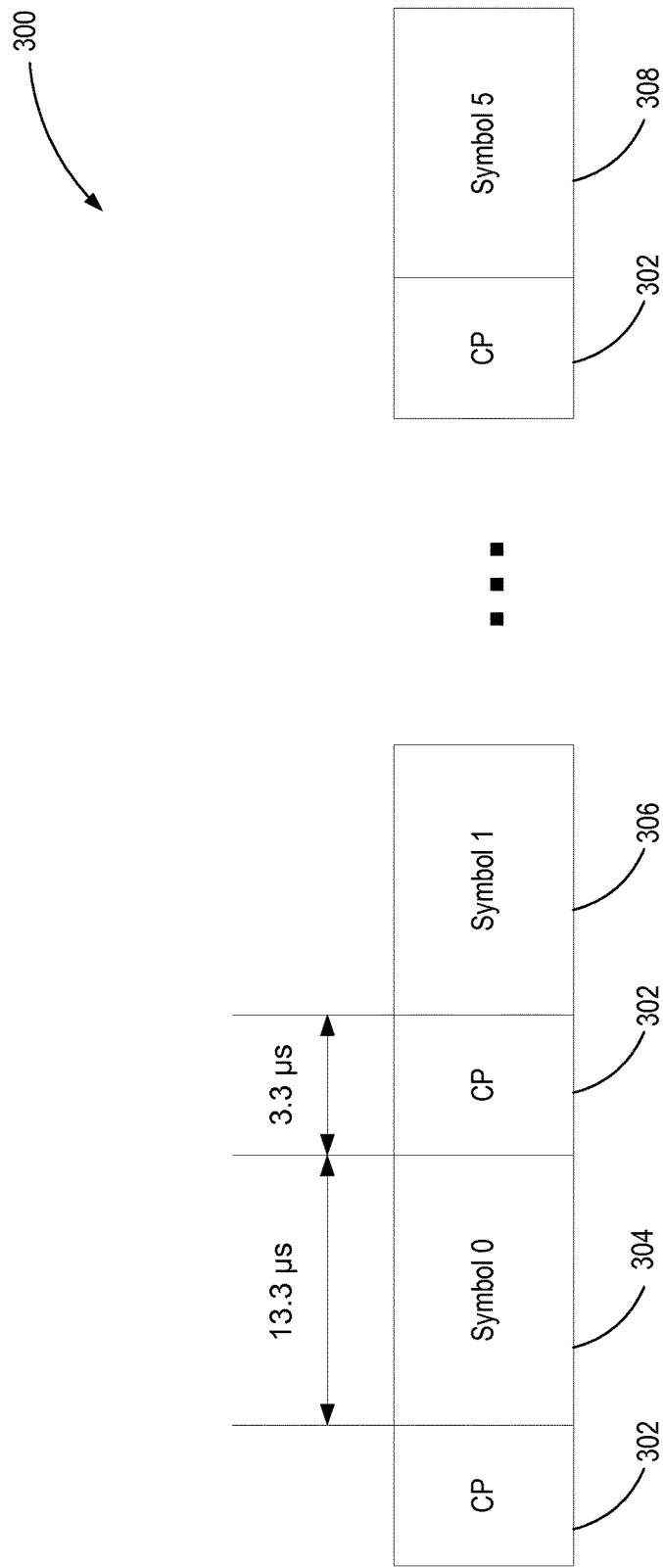
FIG. 3 is a block diagram of a subframe structure for a secondary RAT (S-RAT) for machine-type communication (MTC) applications consistent with embodiments disclosed herein.

FIG. 3 illustrates an example of subframe structure 300 for an S-RAT based on an OFDM waveform. In the figure, 5 ms TTI can be achieved, and within one TTI, 14 OFDM symbols are included and the cyclic prefix (CP) length is ~23.8 µs. In another embodiment, 0.1 ms TTI can be achieved, and within one TTI, six OFDM symbols 304, 306 and 308 are grouped and CP length 302 is ~3.3 µs or 512 samples if the sampling rate is 153.6 MHz. Note that the above example can be easily extended to support other TTIs. For instance, 12 OFDM symbols can be grouped to achieve 0.2 ms TTI. In another example, a different subcarrier spacing can be used (e.g., 60 KHz) to achieve a 0.1 ms or 0.2 ms TTI design with corresponding CP lengths and number of OFDM symbols.

Figure 4:
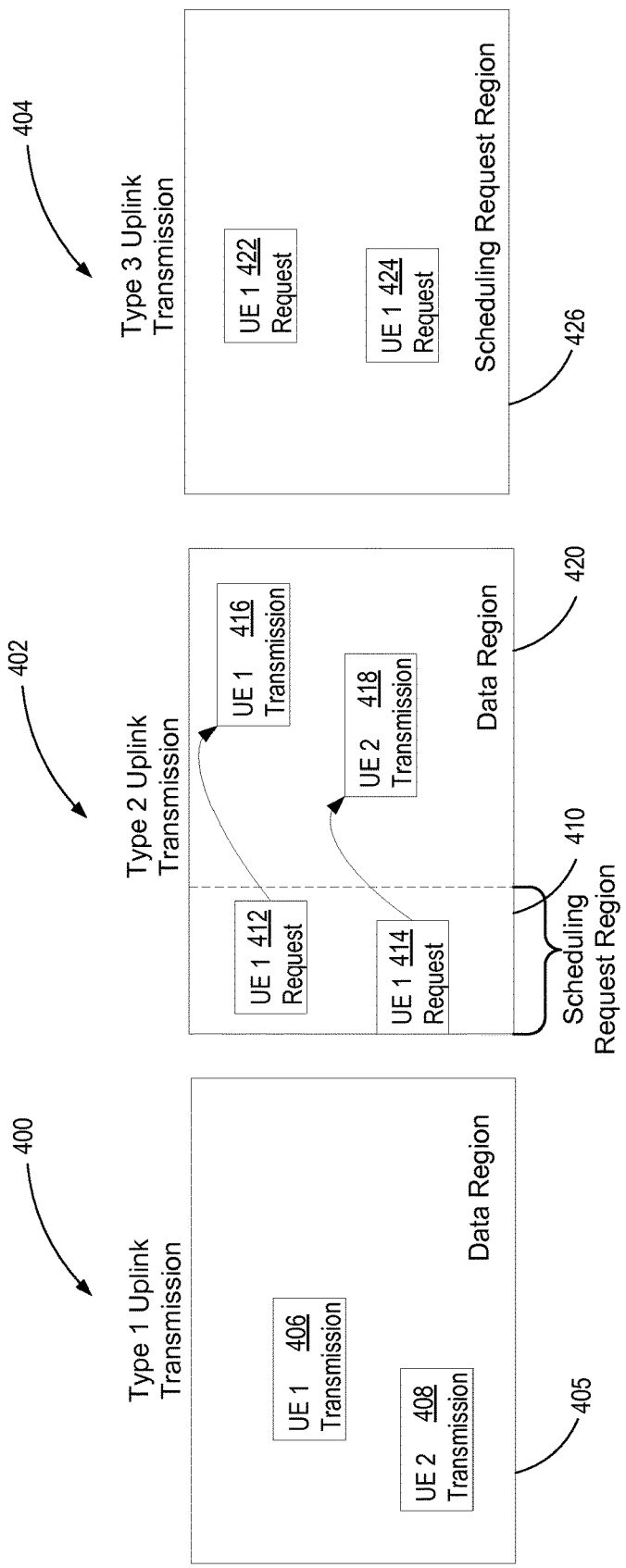
FIG. 4 is a diagram showing a comparison between three embodiments of uplink transmissions with reduced signaling overhead consistent with embodiments disclosed herein.

FIG. 4 is a diagram showing a comparison between three embodiments of uplink transmissions with reduced signaling overhead. To reduce signaling overhead for MTC UEs with infrequent small data burst transmission, different uplink transmission processes can be used. In a first embodiment, described as a Type-1 transmission scheme, a UE selects one resource within the resource pool and transmits data in the uplink on the selected resource. In a second embodiment, described as a Type-2 transmission, a UE selects a resource within the SR region in the resource pool, transmits the SR information on the selected resource which contains the resource allocation for data transmission and transmits the uplink data on the resource which is indicated in the SR information. In a third embodiment, described as a Type-3 transmission scheme, a UE selects a resource within the SR region, transmits the SR on the selected resource with information on the resource selected for subsequent data transmission and transmits on the indicated resource if it receives an ACK, in response to its transmitted SR.

In an embodiment of a Type-1 transmission scheme, an MTC UE randomly selects one resource within the resource pool and transmits the data in the uplink on the selected resource. In some embodiments, this transmission scheme is configured for small packet sizes.

In an embodiment of a Type-2 transmission scheme, an MTC UE randomly selects a resource within the SR region in the resource pool and transmits the SR information on the selected resource which contains the resource allocation for data transmission. In some embodiments, the SR for the Type-2 transmission scheme is a resource indication for the subsequent data transmission and not a request to an eNB for a UL grant. Subsequently, the MTC UE transmits the uplink data on the resource which is indicated in the SR information. Note that this option may be suitable for relatively large packet sizes.

In an embodiment of a Type-3 transmission scheme, an MTC UE randomly selects a resource within the SR region and transmits the SR on the selected resource with information on the resource selected for subsequent data transmission. However, different from a Type-2 transmission scheme, the MTC UE transmits on the indicated resource if the MTC UE receives an ACK, in response to its transmitted SR, granting transmission on the UL from the eNodeB. The physical resource or resource-set that the UE monitors for the ACK response to the SR can have a predefined or configured mapping to the time-frequency resource used for transmission of the SR, with minimal time-gap between the SR transmission opportunity and the ACK response resource in the DL in order to ensure a low overall latency. The ACK response to the SR can help reduce collisions for the actual data transmission that can be beneficial, including advantages for medium to large transmitted data packet sizes and/or in relatively heavy system loading conditions. In addition, this mechanism can reduce the latency and signaling overhead compared to a RACH (random access channel) procedure currently defined for 3GPP LTE/LTE-A systems.

Figure 5:
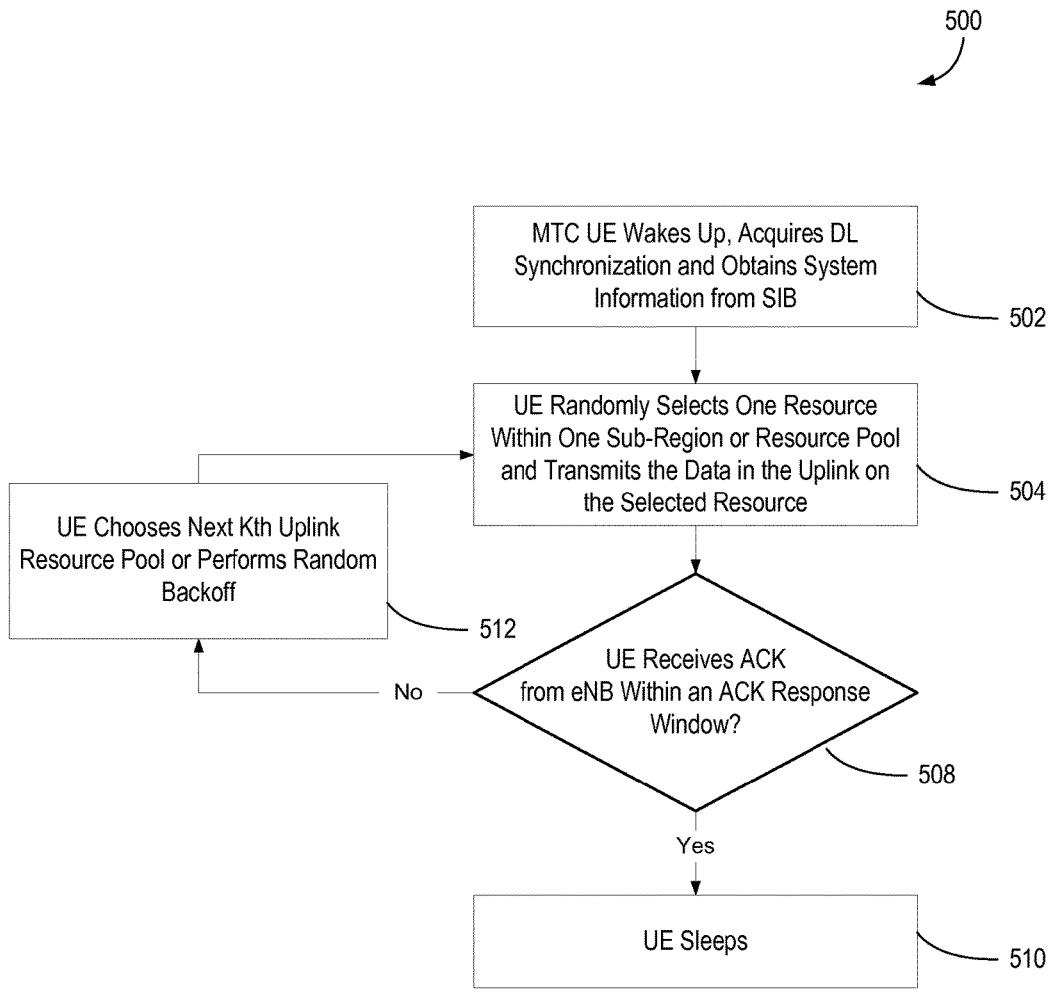
FIG. 5 is a flowchart describing an embodiment of a Type-1 transmission scheme consistent with embodiments disclosed herein.

FIG. 5 is a flowchart describing an embodiment of a Type-1 transmission scheme 500. The transmission scheme 500 can be implemented by systems described in connection with FIG. 1, including an MTC UE, UE, physical infrastructure and network infrastructure.

In block 502, when the MTC UE wakes up and intends to transmit the data in the uplink, it first acquires the DL synchronization signal and obtains the necessary system information from system information block (SIBs). The system information acquisition procedure can be omitted after initial access, e.g., when the MTC UE is static and the system information with respect to MTC transmission does not change. In block 504, the UE randomly selects a resource within one sub-region or resource pool and transmits the data in the uplink on the selected resource. In block 508, the UE monitors the DL subframes within an ACK response window and checks whether it receives an ACK from an eNB. The DL ACK reception procedure can be omitted in an embodiment. Note that the same information (possibly different redundancy versions based on incremental redundancy) can be transmitted multiple times, e.g., over multiple subframes, to improve the coverage via increased energy and time diversity. In block 510, if the UE receives an ACK during the ACK response window, then the UE can transition to a low-power or sleep state. In block 512, if the UE does not receive an ACK during the ACK response window, the UE chooses next Kth uplink resource pool or performs random backoff on the resource pool and selects a resource to transmit the uplink data.

To support uplink transmission, the UE may be allowed to transmit the data in the uplink in an asynchronous manner, i.e., without the need to achieve uplink synchronization with eNB. This asynchronous transmission in the uplink may require certain changes in the CP length in order to minimize the impact due to inter-symbol interference (ISI). Note that, here, "asynchronous" transmissions still assume that the UEs within a cell transmit according to at least a common DL reference time.

In one embodiment, a longer CP length can be defined within the uplink transmission resource pool. Further, MTC UE follows the DL synchronization timing when transmitting the data in the uplink. Note that the long CP can be configured by higher layers, via master information block (MIB), SIB or UE specific dedicated radio resource control (RRC) signaling.

Note that the length of this long CP can be determined according to specific deployment scenarios. In particular, assuming a certain guard time ($T_g$), the maximum distance for uplink transmission can be calculated as $$d_{max} = 2 \cdot c \cdot (T_{CP} - T_g)$$

Where $T_{CP}$ is the CP length in time and $c=3\times10^8$ m/s (the speed of light constant).

For instance, assuming a ~4 μs guard time, extended CP (16.6 μs), as defined in the existing LTE specification, can cover a ~2 km deployment scenario to allow asynchronous uplink transmission. Similarly, if the CP length with 66.7 μs (i.e., one OFDM symbol duration) can be defined for uplink transmission, $d_{max} \approx 10$ km (a transmission distance of 10 km) may be achieved.

Note that if the existing LTE numerology is followed and a longer CP for uplink transmission is used, the CP overhead can be substantial. For instance, if 66.7 μs is defined for CP length, 50% CP overhead is introduced. To reduce the CP overhead, it may be desirable for the same CP length to consider a longer symbol duration by using smaller subcarrier spacing. As mentioned above, if 3 KHz is used for subcarrier spacing and 333.33 μs symbol duration can be defined for narrowband MTC, the overall CP overhead can be reduced to 16.7% CP overhead from 50% overhead of normal subcarrier spacing.

In another embodiment, the UE can apply timing advance (TA) based on the TA value obtained from the initial uplink synchronization. For certain MTC applications, MTC UEs are located in the residual buildings and mobility is not expected for these MTC UEs. In this case, MTC UEs can assume that the same TA values can be applied when transmitting the data in the uplink.

Figure 6:
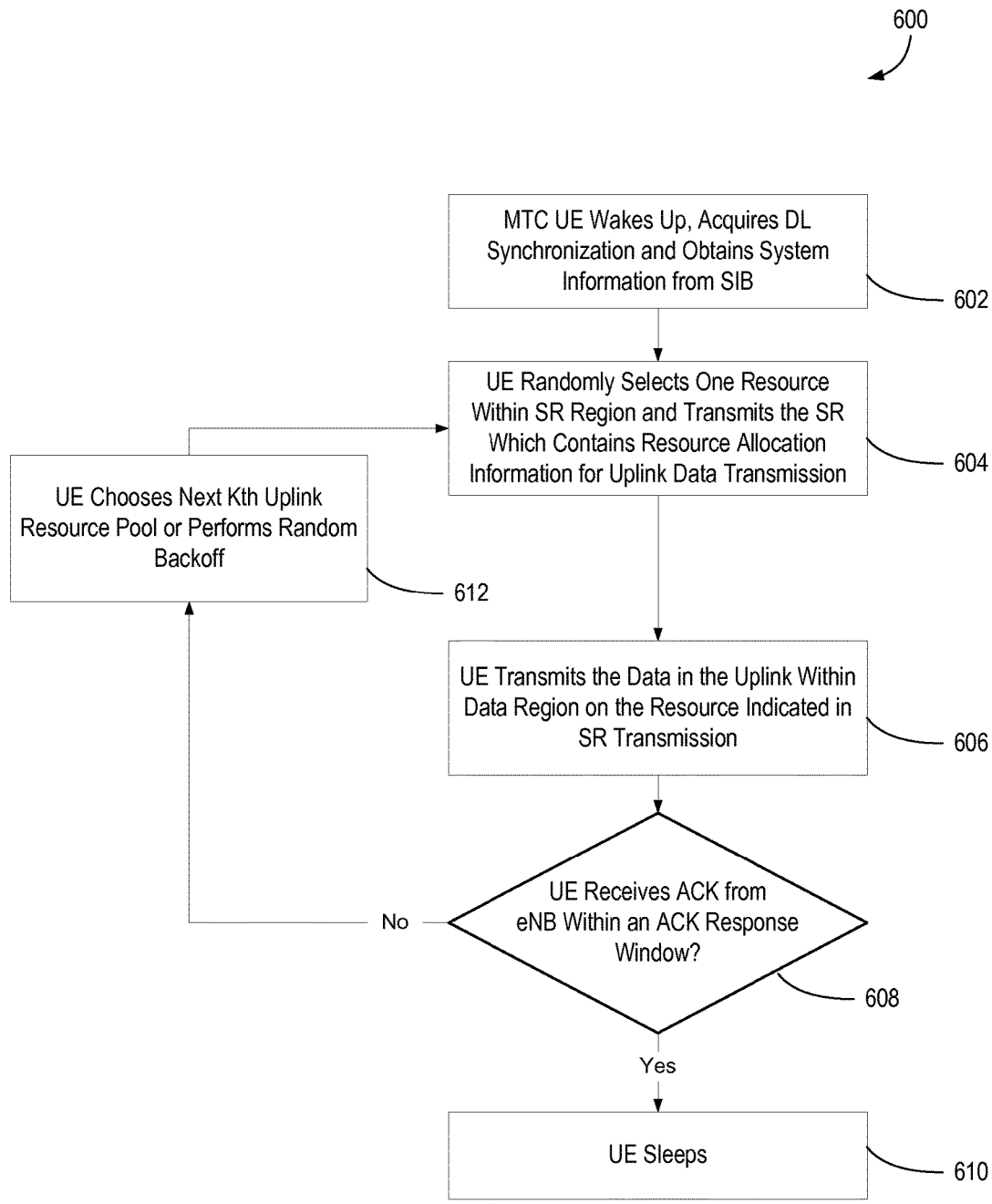
FIG. 6 is a flowchart describing an embodiment of a Type-2 transmission scheme consistent with embodiments disclosed herein.

FIG. 6 is a flowchart describing an embodiment of a Type-2 transmission scheme 600. The transmission scheme 600 can be implemented by systems described in connection with FIG. 1, including an MTC UE, UE, physical infrastructure and network infrastructure.

In block 602, when the MTC UE wakes up to transmit the data in the uplink, it first acquires the DL synchronization signal and obtains the necessary system information from SIBs. The system information acquisition procedure can be omitted after initial access, e.g., when the MTC UE is static and the system information with respect to MTC transmission does not change. In block 604, the MTC UE randomly selects one or multiple physical resources from within the data region for transmission of the UL data and a resource from within the SR region in the resource pool and transmits the SR information on the selected resource which contains the indication of the resource selected for data transmission. In block 606, the MTC UE transmits the uplink data on the resource within the data region which is indicated in the SR information. In block 608, the UE monitors the DL subframes within an ACK response window and checks whether it receives an ACK from an eNB. The DL ACK reception procedure can be omitted in an embodiment. Note that the same information (possibly different redundancy versions based on incremental redundancy) can be transmitted multiple times, e.g., over multiple subframes to improve the coverage via increased energy and time diversity. In block 610, if the UE receives an ACK during the ACK response window, then the UE can transition to a low-power or sleep state. In block 612, if the UE does not receive an ACK during the ACK response window, the UE chooses the next Kth uplink resource pool or performs random backoff on the resource pool and selects a resource to transmit the uplink data.

Figure 7:
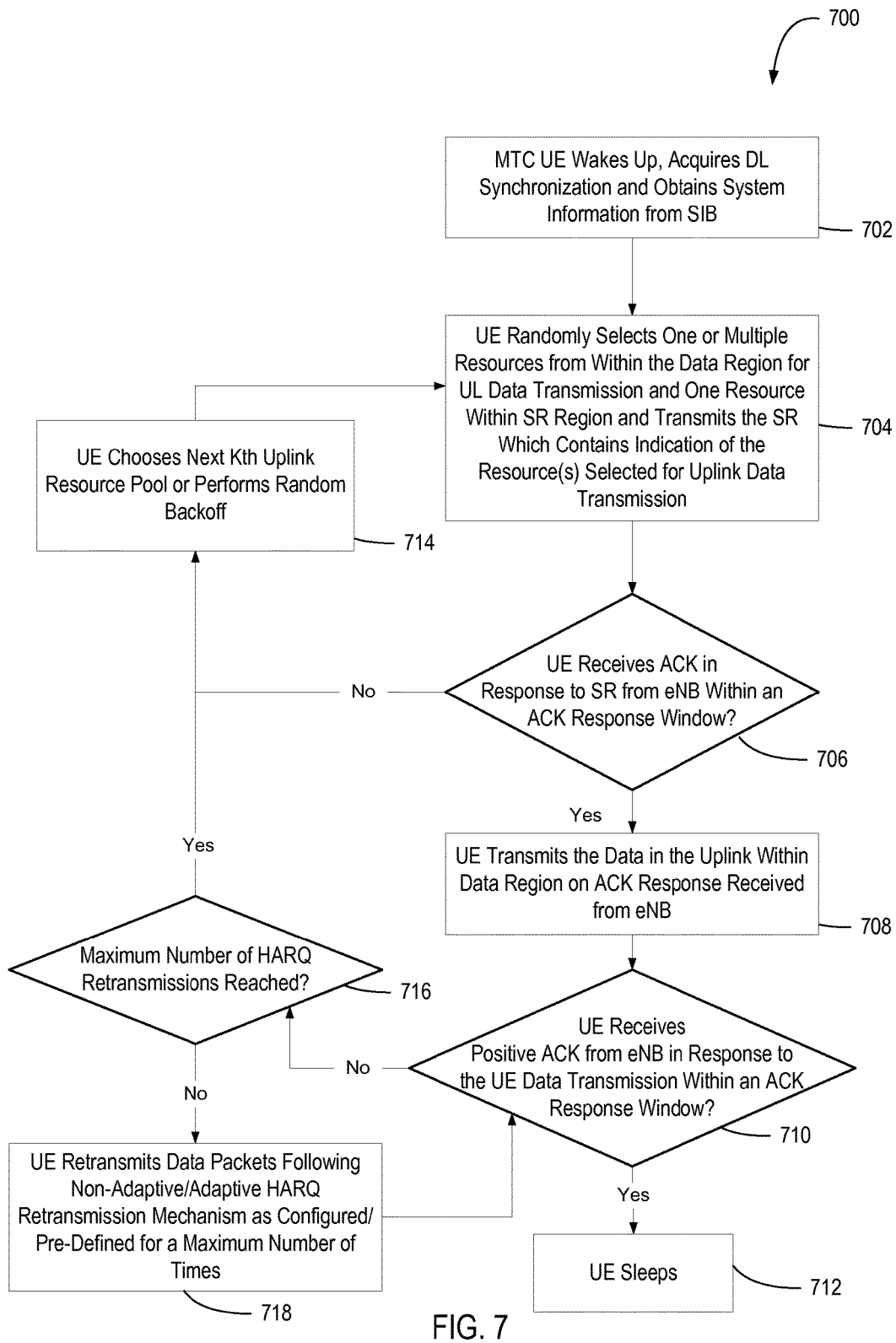
FIG. 7 is a flowchart describing an embodiment of a Type-3 transmission scheme consistent with embodiments disclosed herein.

FIG. 7 is a flowchart describing an embodiment of a Type-3 transmission scheme 700. The transmission scheme 700 can be implemented by systems described in connection with FIG. 1, including an MTC UE, UE, physical infrastructure and network infrastructure.

In block 702, when the MTC UE wakes up to transmit the data in the uplink, it first acquires the DL synchronization signal and obtains the necessary system information from SIBs. The system information acquisition procedure can be omitted after initial access, e.g., when the MTC UE is static and the system information with respect to MTC transmission does not change. In block 704, the MTC UE randomly selects one or multiple physical resources from within the data region for transmission of the UL data and a resource from within the SR region in the resource pool and transmits the SR information on the selected resource which contains the indication of at least the resource selected for data transmission, and possibly also the modulation and coding scheme (MCS) to be used for the data transmission. In block 706, the MTC UE monitors the DL subframes within an ACK response window corresponding to the SR transmission to receive at least confirmation from the eNodeB on whether the UE should transmit on the selected resources, and possibly also including one or more of: the value of TA and transmit power control (TPC) adjustment to be used for the data transmission, alternative resources for data transmission, and alternative MCS level to be used for data transmission. In block 714, if the UE does not receive an ACK during the ACK response window corresponding to SR transmission, the UE chooses the next Kth uplink resource pool or performs random backoff on the resource pool and selects resources to transmit the SR and the subsequent uplink data. However, in block 708, if the UE receives an ACK during the ACK response window corresponding to the SR transmission, the UE transmits the uplink data on the resource within the data region based on the ACK feedback received from the eNB in response to the SR transmission. In block 710, the UE monitors the DL subframes within an ACK response window and checks whether it receives an ACK from an eNB. The DL ACK reception procedure can be omitted in some embodiments. Note that the same information (possibly different redundancy versions based on incremental redundancy) can be transmitted multiple times, e.g., over multiple subframes to improve the coverage via increased energy and time diversity. In block 712, if the UE receives an ACK during the ACK response window, then the UE can transition to a low-power or sleep state. In block 716, however, if the UE does not receive an ACK or receives a Negative Acknowledgment (NACK) during the ACK response window corresponding to UL data transmission, the UE retransmits the data packets following the configured or pre-defined Hybrid ARQ (HARM) retransmission scheme in block 718, or the UE chooses the next Kth uplink resource pool or performs random backoff on the resource pool and selects resources to transmit the SR and the subsequent uplink data in block 714.

Figure 8:
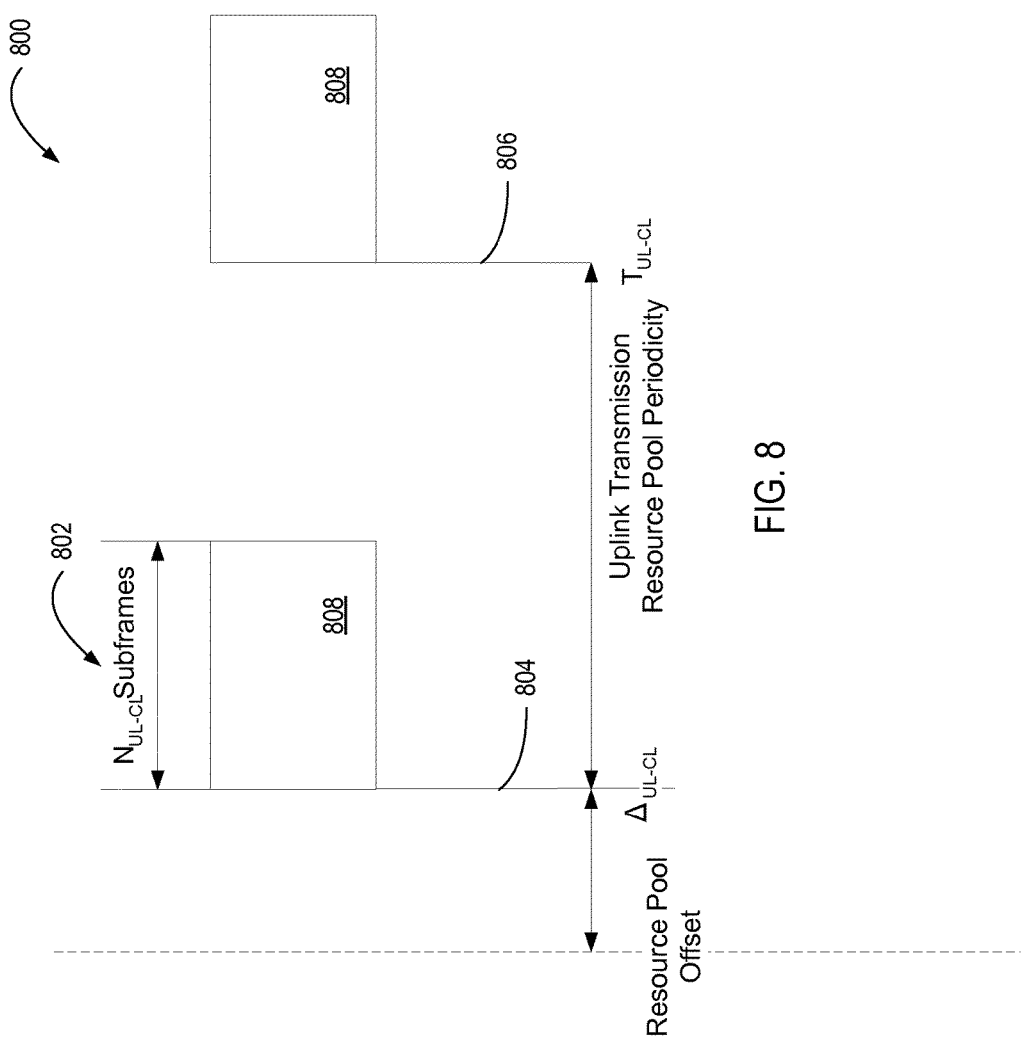
FIG. 8 is a diagram illustrating resource pool periodicity consistent with embodiments disclosed herein.

FIG. 8 is a diagram of resource pool periodicity 800. Initially, MTC devices would access the network and acquire the necessary information for resource pools 808 for uplink transmission. The configuration of this resource pool 808 can be predefined or provided by the higher layers via MIB or SIB or UE specific dedicated RRC signaling.

The time and frequency resource configuration for uplink transmission resource pool 808 may comprise at least one of the following information: frequency location (e.g., in resource block (RB) index region) and/or time location (e.g., OFDM symbol index, slot index, subframe index, radio frame index). As a more specific example to signal time related information, the configuration can contain at least periodicity 806 and/or subframe offset 804 for this resource pool 808.

The subframes allocated for uplink transmission resource pool 808 can be contiguous or non-contiguous. For instance, for an frequency division duplex (FDD) system, contiguous DL subframes can be allocated for this resource pool 808. For a time division duplex (TDD) system, non-contiguous subframes can be allocated for this resource pool 808. In particular, a subframe bit map with parameter "subframeBitMap" can be used to signal the allocated subframe, which can be repeated within the resource pool 808. For instance, subframeBitMap="0011000011" and length of resource pool 808 in subframes is 20. In this case, the first and second radio frames have the same subframe bit map, and subframes #2, #3, #8 and #9 in each frame are allocated for this resource pool 808.

As shown in FIG. 8, the first subframe of the $N_{UL-CL}$ DL subframes 802 of the uplink transmission resource pool, shall satisfy $$(10 \times n_f + \lfloor n_s/2 \rfloor - \Delta_{UL-CL}) \bmod T_{UL-CL} = 0$$

where $n_f$ and $n_s$ are radio frame number and slot number.

In the frequency domain, the uplink transmission resource pool 808 can be allocated in contiguous or non-contiguous PRBs or subcarriers. In one embodiment, the starting PRB with parameter "startPRB" and the size of MTC resource pool "lengthPRB" can be used to indicate the frequency information of the resource pool. According to this, a PRB with an index greater than or equal to startPRB and less than startPRB+prbLength is allocated for the uplink transmission resource pool 808.

In another embodiment, two non-overlapping frequency locations can be allocated for the transmission resource pool 808. In particular, the starting PRB with parameter "startPRB" and the "lengthPRB1" can be used to indicate the first part of the resource pool in the frequency domain, i.e., a PRB with an index greater than or equal to startPRB and less than startPRB+lengthPRB1 is allocated. For the second part of the MTC resource pool, the end PRB can be used to indicate the last part of the resource pool with parameter "endPRB" and the "lengthPRB2," i.e., a PRB with an index lesser than or equal to endPRB and greater than endPRB−lengthPRB2 is allocated.

Note that although PRB is considered in the above options, the frequency domain configuration can be easily extended based on subcarrier index and/or block/group of PRBs.

As mentioned above, for Type-2 and Type-3 uplink transmission, resource pool 808 can be further divided into an SR region and a data region for uplink transmission. Note that resource partition information can be predefined or configured by higher layer via MIB, SIB or UE specific RRC signaling.

Figure 9:
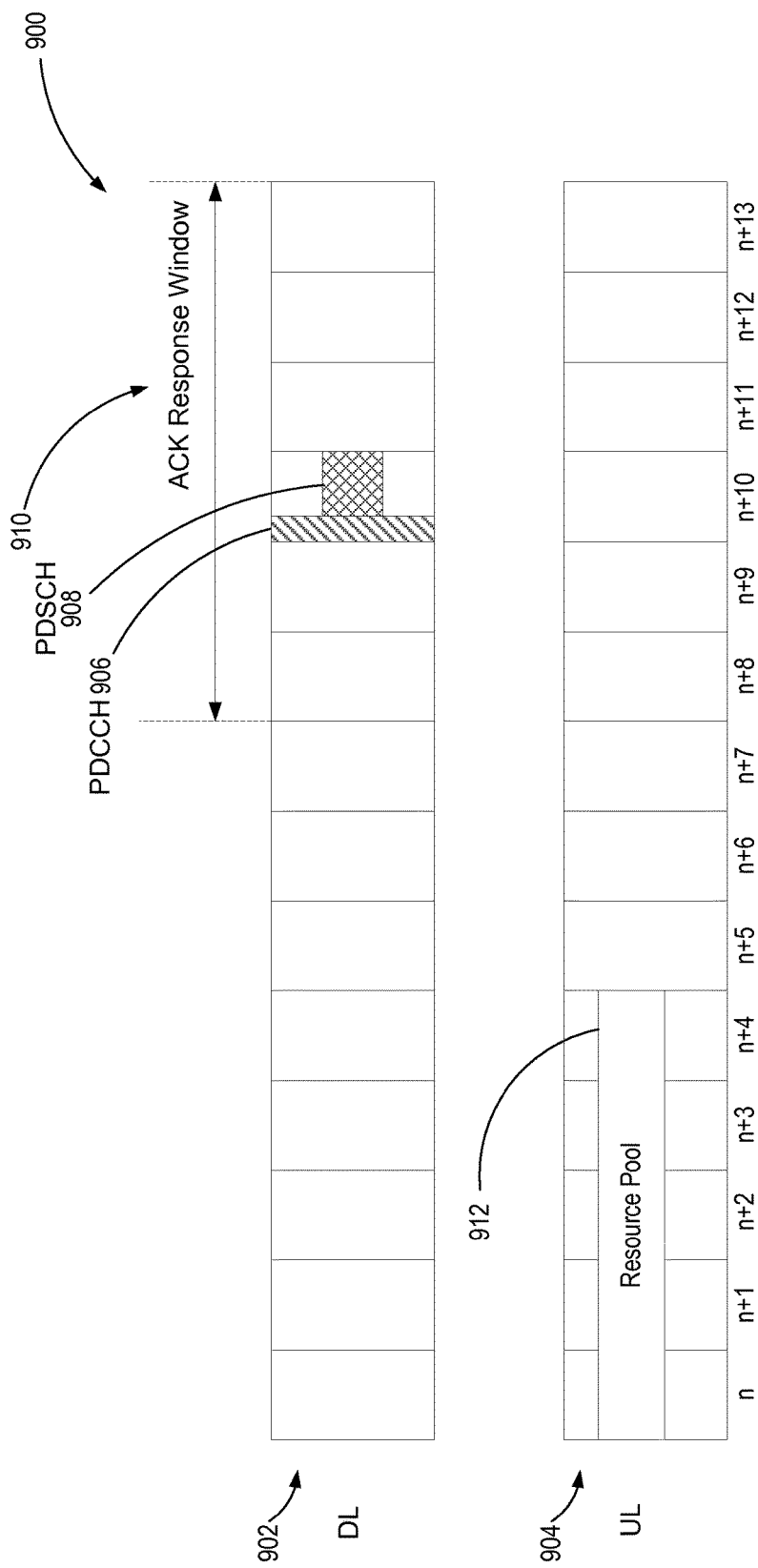
FIG. 9 is a diagram of an acknowledgement (ACK) response window consistent with embodiments disclosed herein.

FIG. 9 shows a diagram 900 of an ACK response window 910 in the DL 902 in response to transmission in the resource pool 912 in the UL 904. When an MTC UE transmits the uplink data, it waits for the ACK feedback from an eNB within an ACK response window 910. For some embodiments of the three types of UL transmission schemes described, the ACK feedback refers to feedback in response to the data transmission. A position of the ACK response window 910 can be predefined or configured by higher layer via MIB, SIB or UE specific RRC signaling.

The starting position of the ACK response window 910 can be defined relative to the starting or last subframe or any one of the subframes wherein MTC UE transmits the uplink data within the resource pool 912 or the starting or last subframe of the resource pool 912. FIG. 9 illustrates the case when the ACK response window 910 is defined relative to the last subframe of the resource pool 912. In the example shown in FIG. 9, the resource pool 912 occupies the subframes n to n+4, while the ACK response window 910 is from subframes n+8 to n+13. This indicates that after MTC UE transmits the uplink data on the randomly selected resource within the resource pool 912, it will wait for the ACK response from an eNB from n+8 to n+13.

Depending on whether the ACK feedback is UE specific or is transmitted in a group manner, several options can be considered regarding the ACK feedback mechanisms. In one embodiment, a physical hybrid automatic repeat request indicator channel (PHICH) can be used to carry ACK feedback in a UE specific manner. In order to avoid the resource collision from other UEs, a fixed timing relationship between the resource when MTC UE transmits the uplink data and PHICH transmission can be defined. Further, the PHICH resource index can be defined as a function of UE ID, the starting subframe and/or the PRB index wherein MTC UE transmits the uplink data.

In the existing LTE specification, the PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group. In one example, $(n_{PHICH}^{group}, n_{PHICH}^{seq})$ can be given by $$(n_{PHICH}^{group}, n_{PHICH}^{seq}) = f(ID_{UE}, n_{PRB}, n_{SF})$$

Where $ID_{UE}$ is the UE ID; $n_{PRB}$ and $n_{SF}$ are the starting PRB and subframe wherein MTC UE transmits the uplink data, respectively.

In another embodiment, physical downlink shared channel (PDCCH) 906 can be used to carry ACK feedback in a UE specific manner. In this case, MTC UE needs to monitor the PDCCH 906 within the ACK response window. In order to allow efficient PDCCH decoding, a new radio network temporary identifier (RNTI) (CL_RNTI) can be defined for uplink transmission. More specifically, this RNTI can be defined as a function of UE identifier (ID) and/or the starting PRB and subframe wherein MTC UE transmits the uplink data, i.e., $$CL\_RNTI = f(ID_{UE}, n_{PRB}, n_{SF})$$

In one example, this RNTI can be given by $$CL_{RNTI} = c_0 \cdot n_{PRB} + c_1 \cdot n_{SF} + c_2 \cdot ID_{UE} + c_3,$$

Where $c_0$, $c_1$, $c_2$ and $c_3$ are constants, which can be predefined in the specification or configured by higher layers via MIB, SIB or UE specific dedicated RRC signaling.

Further, the UE ID needs to be included in the downlink control information (DCI) format in PDCCH transmission for contention resolution. Depending on the exact number of bits for UE ID, zero padding can be considered to match with other DCI formats. For instance, if the number of bits for the UE ID is relatively small, zero padding can be considered to match with DCI format 1C.

In another embodiment, 5G DL control channel (e.g., PDCCH 906 or PDCCH-like) and 5G DL data or shared channel (e.g., physical downlink shared channel (PDSCH) 908 or PDSCH-like) can be used to carry ACK feedback in a group manner. In particular, an ACK response message can be defined and transmitted in the DL data or shared channel (e.g., PDSCH 908). In the case when multiple UEs transmit the data within the same resource pool, an eNB can aggregate multiple ACK response messages and transmit in one DL data or shared channel (e.g., PDSCH 908). Note that this option may reduce the blockage for DL control channel (e.g., PDCCH 906) transmission.

Note that the UE ID is included in the ACK response message. The resource information (resource ID) in the time and frequency domain within the resource pool wherein MTC UE transmits the uplink data can be included in the ACK response message or in the media access control (MAC) subheader for an aggregated ACK response message. This resource ID can be represented as a function of $n_{PRB}$ and $n_{SF}$.

Figure 10:
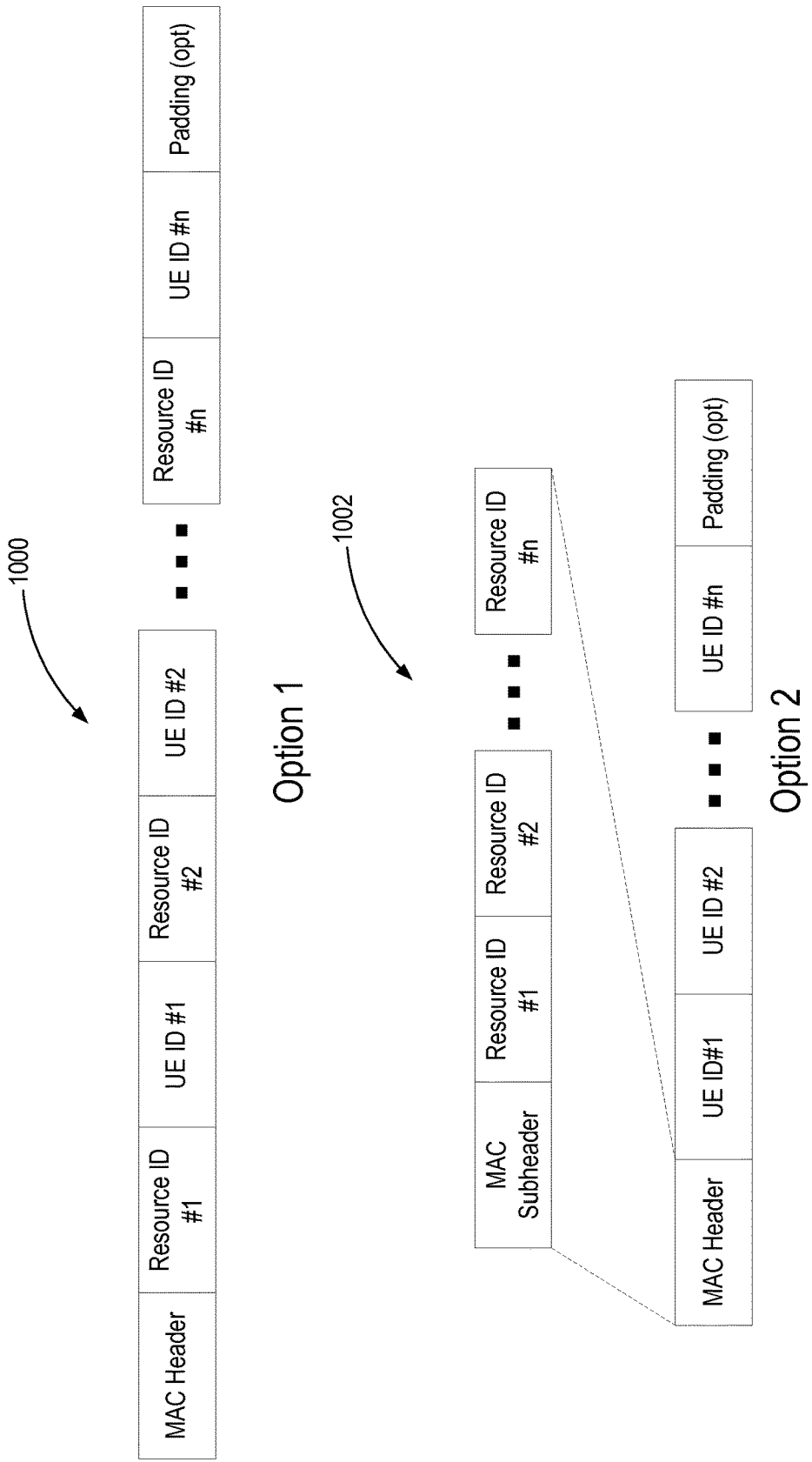
FIG. 10 a diagram of aggregated ACK response message options consistent with embodiments disclosed herein.

FIG. 10 is a diagram of aggregated ACK response message options. Two options can be considered on the aggregated ACK response messages. In option 1 (1000), Resource ID and UE ID are included in the MAC payload for aggregated response message transmission. In option 2 (1002), Resource ID is included in the MAC header, while the UE ID is included in the MAC payload.

The existing DCI format for DL assignment in the LTE specification can be considered for the PDSCH scheduling for an ACK response message transmission. Similar to the option mentioned above, a new RNTI (CL_RNTI) can be defined for uplink transmission. This RNTI can be defined as a function of the starting PRB and subframe for the resource pool, i.e., $$CL\_RNTI = f(n_{PRB\_pool}, n_{SF\_pool})$$

Where $n_{PRB\_pool}$ and $n_{SF\_pool}$ are the starting PRB and subframe for the resource pool, respectively.

In one example, this RNTI can be given by $$CL\_RNTI = a_0 \cdot n_{PRB\_pool} + a_1 \cdot n_{SF\_pool} + a_2$$

Where $a_0$, $a_1$ and $a_2$ are constants, which can be predefined in the specification or configured by higher layers via MIB, SIB or UE specific dedicated RRC signaling.

For a Type-3 uplink transmission scheme, the eNodeB can indicate, in the ACK response message in response to the initial SR transmission from the UE, whether the UE should transmit its UL data on the randomly selected resources from within the data region (as indicated in the SR message) or reselect resources for data transmission and transmit SR again at the next opportunity, with or without the application of additional backing-off (options for the backing-off procedures are disclosed in a later section in this disclosure). Further, the ACK response to the SR can also be used by the eNodeB to indicate alternative resources from the data region (associated with the current SR region). The size of the alternative resource can be matched to the size of the original data transmission resources selected by the UE if the same MCS level to be used for data transmission is not changed, with the latter being interpreted as an implicit buffer status report (BSR) from the UE.

If multiple MCS levels are supported for data transmissions following the Type-3 UL transmission scheme, the ACK response to the SR can also indicate if a different MCS is to be used for the data transmission along with appropriate modification to the size of the physical resources to be used for data transmission.

Additionally, the amount of TA that the UE applies to the DL reference time for the transmission of the data packet can also be indicated in this ACK response to the SR transmission, thereby facilitating synchronous UL reception at the eNodeB for the data transmission. Fine tuning of the transmit power control for the subsequent data transmission can also be indicated in this ACK response message using a limited number of additional bits.

The resources and physical channels used for the DL transmission of the ACK response to the SR can be designed based on the options described for transmission of the ACK response to data transmission in the previous subsection, i.e., using a design based on PHICH (as Layer 1 control information) or based on DL control channels (as Layer 1 control information), or carried in the shared channel (as MAC payload carried by the physical DL shared channel).

Specifically, in one embodiment, Layer 1 signaling (e.g., the physical DL control channel) can be used to carry the ACK response to the SR in a UE-specific manner. Specifically, the ACK response to the SR can be designed based on a compact version of the currently defined DCI format 0 in LTE/LTE-Advanced systems, with the C-RNTI replaced by an appropriate CL-RNTI. The CL-RNTI can be defined as a function of the UE ID and time and frequency resource indices of the transmitted SR or the starting time and frequency resource indices of the data transmission resource indicated in the SR. This option of defining a compact form of DCI format 0 may be more suitable if the ACK response to SR includes, for example, indication of alternative resources for data transmission (different from the resource indicated by the UE in the SR) and the TA indication.

In another embodiment, the group-ACK response can be defined wherein the eNodeB indicates whether the UEs addressed in the group-ACK response should transmit on their respectively selected resources or reselect at the next opportunity, with or without the application of additional backing-off. The response can be carried as MAC payload in the shared channel and scheduled by the DL assignment that is designed similar to or based on DCI format 1C using a CL-RNTI that is defined for the group of UEs as exemplified in the previous subsection.

Figure 11:
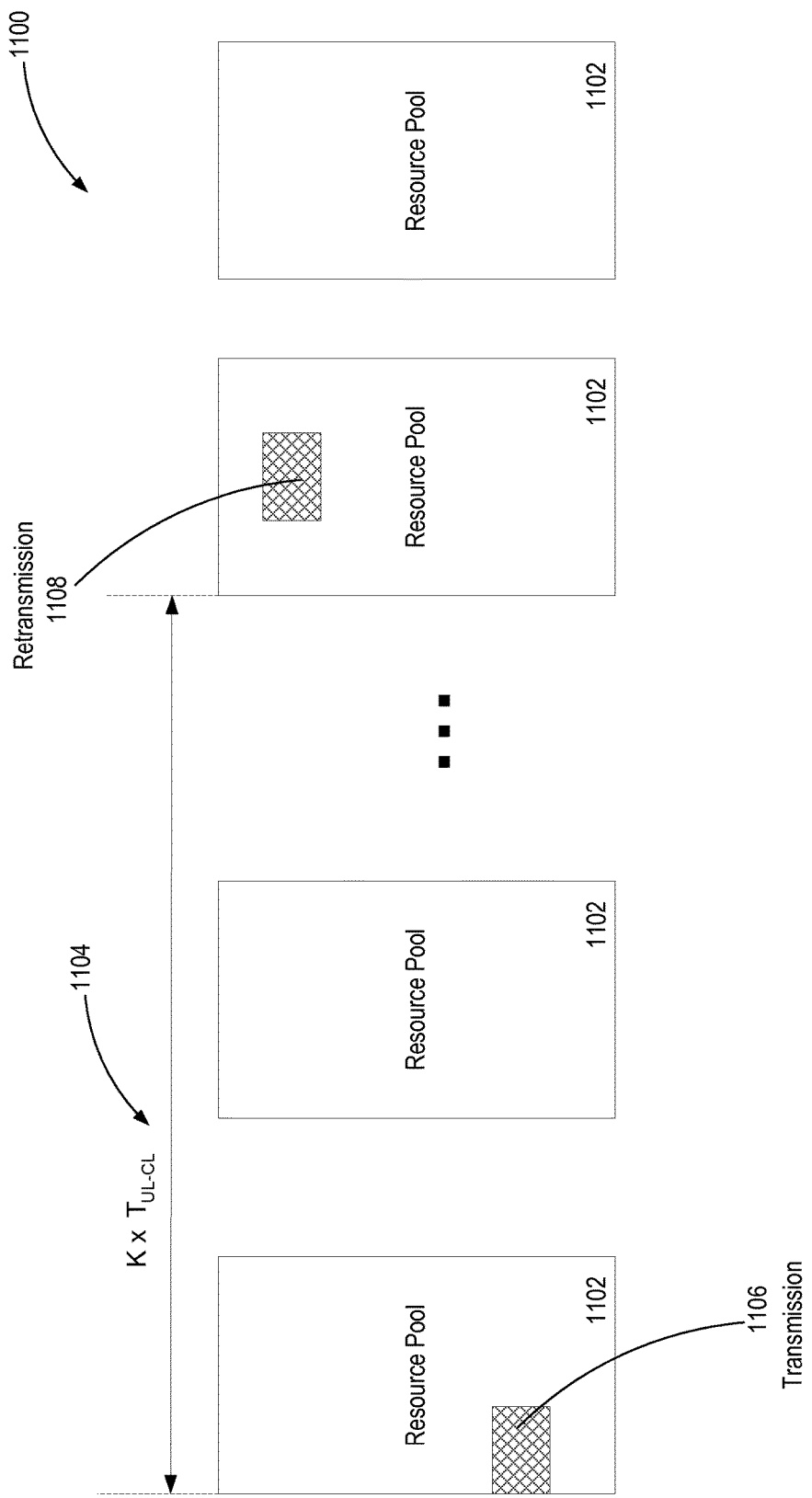
FIG. 11 is a diagram of a retransmission scheme with reduced signaling overhead consistent with embodiments disclosed herein.

FIG. 11 is a diagram of a retransmission scheme 1100 with reduced signaling overhead. If an MTC UE does not receive the ACK response from an eNB within the ACK response window, the UE may need to wait until next opportunity for uplink data transmission or for the SR retransmission in the case of a Type-3 UL transmission scheme if the ACK feedback from an eNB in response to the SR transmission is either not received at the UE or the ACK response instructs the UE to reselect a different data transmission resource and retransmit the SR with the updated data transmission resource indication. This may be realized by a fixed delay or random backoff on the resource pool 1102. As shown in FIG. 11, an MTC UE waits for next Kth resource pool 1102 for retransmission 1108 if it fails to receive the ACK response from the eNB regarding the prior transmission 1106.

In one embodiment, a fixed delay K on the resource pool can be considered, wherein K can be predefined in the specification or configured by the higher layers via MIB, SIB or UE specific dedicated RRC signaling.

In another embodiment, an MTC UE performs random backoff on the retransmission. In particular, the MTC UE randomly chooses one value K within a window [0, W−1], wherein window size W can be predefined or configured by the higher layers via MIB, SIB or UE specific dedicated RRC signaling.

In one option, window size W can be fixed for each retransmission. In another option, window size W can be doubled for each retransmission, i.e., $$W(k) = W(0) \cdot 2^{PUSCH\_CL\_TX\_COUNTER-1}$$

This may help to reduce the resource collision rate for a heavily loaded system.

When the uplink transmission counter (PUSCH_CL_TX_COUNTER) reaches the maximum value (PUSCH_CL_TX_MAX), the MTC UE may go back to sleep and wake up on the next scheduled time for uplink transmission. Alternatively, the MTC UE may perform a regular uplink transmission procedure, including a RACH procedure on the resource other than uplink resource pool for uplink data transmission. Note that the maximum value (PUSCH_CL_TX_MAX) can be predefined in the specification or configured by the higher layers via MIB, SIB or UE specific dedicated RRC signaling.

In contrast to types 1 or 2, for Type-3 UL transmissions, the ACK feedback in response to the data transmission can also indicate a NACK. Further, a HARQ retransmission mechanism can also be devised for the data transmission for Type-3 UL transmissions. In case the UE receives a NACK indication in response to the data transmission, it can proceed with HARQ retransmissions for the data instead of restarting the procedure of SR transmission. The HARQ retransmission mechanism can be non-adaptive (i.e., use the same MCS but same or different redundancy versions as the initial data transmission) or adaptive. The NACK message can also include an explicit indication of the physical resources to be used for the retransmission of the data or, alternatively, the retransmission resources can be defined to maintain a deterministic or pseudo-random relationship to the resources used for the initial transmission, wherein the identification of the resources is done based on a combination of one or more of the indices or the starting indices (for the case of multiple resources) of the time resources, frequency resources, and indices of the data region resource pool.

After a maximum number of HARQ retransmission attempts are reached, the UE can fall back to the resource reselection steps for SR and data transmission as for a Type-2 UL transmission scheme.

As used herein, the term "circuitry" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 12:
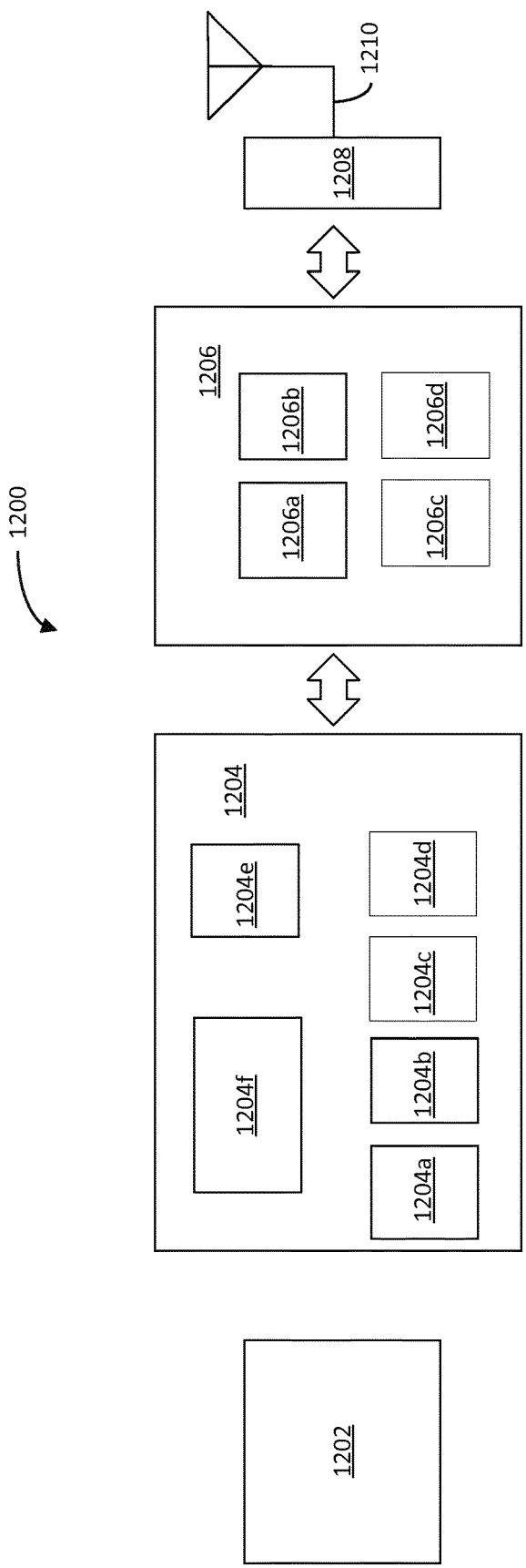
FIG. 12 is an example illustration of a user equipment (UE) device consistent with embodiments disclosed herein.

Embodiments described herein may be implemented into a system using any suitably configured hardware and/or software. FIG. 12 illustrates, for one embodiment, example components of a UE device 1200. In some embodiments, the UE device 1200 may include application circuitry 1202, baseband circuitry 1204, Radio Frequency (RF) circuitry 1206, front-end module (FEM) circuitry 1208 and one or more antennas 1210, coupled together at least as shown.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., 5G, sixth generation (6G), etc.). The baseband circuitry 1204 (e.g., one or more of baseband processors 1204a-d) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or low density parity check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204f. The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206*d*. The amplifier circuitry 1206*b* may be configured to amplify the down-converted signals and the filter circuitry 1206*c* may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206*a* of the receive signal path may comprise passive mixers, although the scope of the embodiments is not limited in this respect.

In some embodiments, the mixer circuitry 1206*a* of the transmit signal path may be configured to up-convert input baseband signals based on the synthesized frequency provided by the synthesizer circuitry 1206*d* to generate RF output signals for the FEM circuitry 1208. The baseband signals may be provided by the baseband circuitry 1204 and may be filtered by filter circuitry 1206*c*. The filter circuitry 1206*c* may include a low-pass filter (LPF), although the scope of the embodiments is not limited in this respect.

In some embodiments, the mixer circuitry 1206*a* of the receive signal path and the mixer circuitry 1206*a* of the transmit signal path may include two or more mixers and may be arranged for quadrature downconversion and/or upconversion respectively. In some embodiments, the mixer circuitry 1206*a* of the receive signal path and the mixer circuitry 1206*a* of the transmit signal path may include two or more mixers and may be arranged for image rejection (e.g., Hartley image rejection). In some embodiments, the mixer circuitry 1206*a* of the receive signal path and the mixer circuitry 1206*a* may be arranged for direct downconversion and/or direct upconversion, respectively. In some embodiments, the mixer circuitry 1206*a* of the receive signal path and the mixer circuitry 1206*a* of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206*d* may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer comprising a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210.

In some embodiments, the UE device 1200 may include additional elements such as, for example, memory/storage, display, camera, sensor, and/or input/output (I/O) interface.

Figure 13:
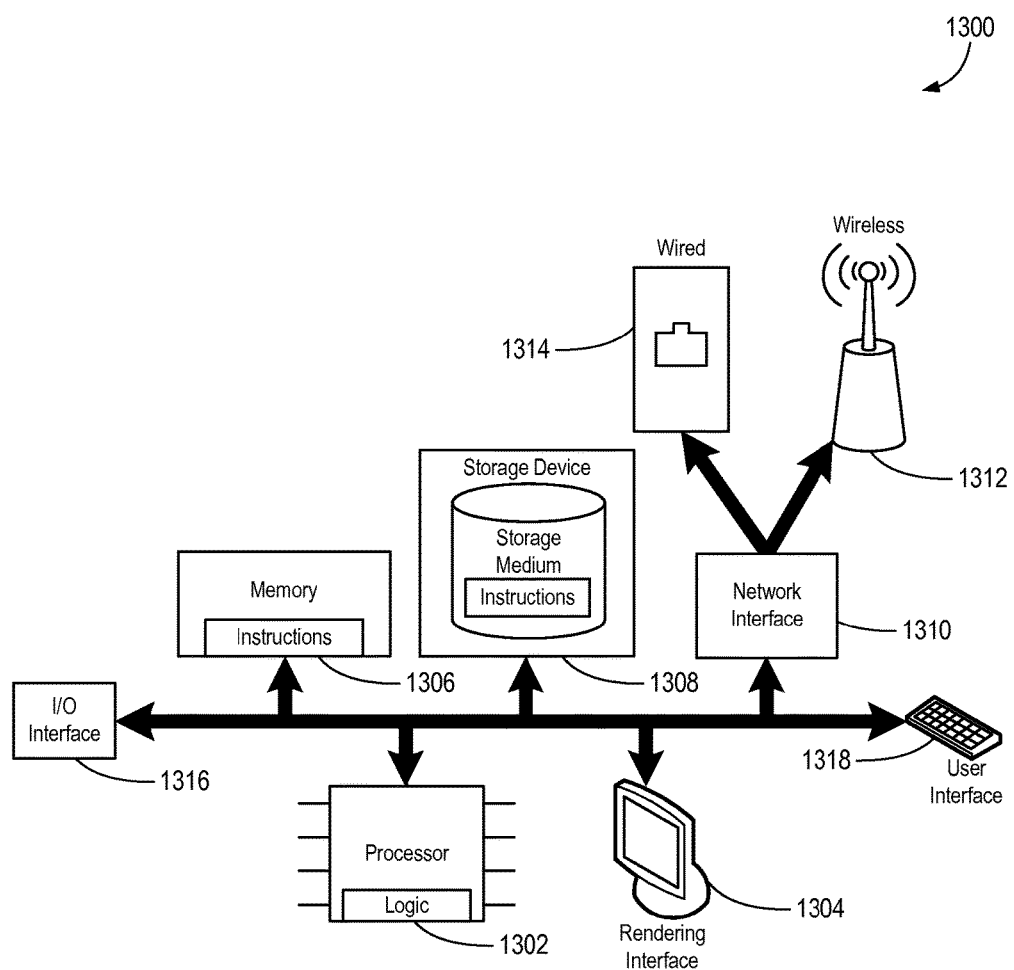
FIG. 13 is a schematic diagram of a computing system consistent with embodiments disclosed herein.

FIG. 13 is a schematic diagram of a computing system 1300. The computing system 1300 can be viewed as an information passing bus that connects various components.

In the embodiment shown, computing system 1300 includes a processor 1302 having logic 1302 for processing instructions. Instructions can be stored in and/or retrieved from memory 1306 and a storage device 1308 that includes a computer-readable storage medium. Instructions and/or data can arrive from a network interface 1310 that can include wired 1314 or wireless 1312 capabilities. Instructions and/or data can also come from an I/O interface 1316 that can include such things as expansion cards, secondary buses (e.g., USB, etc.), devices, etc. A user can interact with the computing system 1300 though user interface devices 1318 and a rendering system 1304 that allows the computer to receive and provide feedback to the user.

EXAMPLES

Example 1 is a user equipment (UE) including a wireless interface configured to communicate over one or more radio access technologies (RATs) with an enhanced node B (eNB). The UE also includes a processor to provide uplink transmission through the one or more RATs to the eNB. The processor is configured to acquire a downlink (DL) synchronization signal from the eNB. The processor is further configured to obtain an uplink (UL) resource pool information from a System Information Block (SIB) transmitted by the eNB. The processor is also configured to transmit, through the wireless interface, data in a selected uplink resource from a resource pool to the eNB without approval of the eNB and determine whether the data was received by the eNB.

In Example 2, the UE of Example 1 can optionally transmit data in a randomly selected uplink resource in the resource pool.

In Example 3, the UE of Examples 1-2 can optionally select one resource from within the resource pool.

In Example 4, the UE of Examples 1-3 can optionally monitor DL subframes within an acknowledgement (ACK) response window.

In Example 5, the UE of Examples 4 can optionally include baseband processing circuitry that is configured to receive an ACK response for the transmitted data that is aggregated with other ACK responses for other transmitted data of other UEs.

In Example 6, the UE of Example 1-5 wherein optionally the one or more RATs comprise a primary RAT (P-RAT) and secondary RAT (S-RAT), and wherein a DL is the primary RAT (P-RAT) and a UL is the secondary RAT (S-RAT).

In Example 7, the UE of Example 1-5 wherein optionally wherein the one or more RATs comprise a primary RAT (P-RAT) and secondary RAT (S-RAT), and wherein the DL is the S-RAT and the UL is the P-RAT.

In Example 8, the UE of Examples 1-7 wherein optionally a radio network temporary identifier (RNTI) is defined as a function of an identifier of the UE, a starting physical resource block (PRB) and subframe of the transmitted data.

Example 9 is a baseband processor for a user equipment (UE) that includes baseband circuitry configured to receive a synchronization signal provided over a mobile broadband network by a base station. The baseband circuitry can also be configured to determine a set of uplink resources within the mobile broadband network of the base station. The baseband circuitry can further be configured to randomly select a resource from within the set of uplink resources. The baseband circuitry can also be configured to transmit a scheduling request for the selected resource to the base station. The baseband circuitry can further be configured to transmit data in a selected resource to the base station.

In Example 10, the baseband processor of Example 9 wherein optionally a configuration defining the uplink resources is predefined, provided by the higher layers via master information block (MIB), system information block (SIB) or UE specific dedicated radio resource control (RRC) signaling.

In Example 11, the baseband circuitry of Examples 9-10 can optionally be configured to transmit data in a selected uplink resource without approval of the scheduling request by the base station.

In Example 12, the baseband processor of Examples 9-11 wherein optionally the resource pool is further divided into a scheduling request region and a data region for uplink transmission.

In Example 13, the baseband circuitry of Examples 9-12 can optionally be configured to determine whether the data was received by an enhanced node B (eNB).

In Example 14, the baseband circuitry of Example 13 can optionally be configured to monitor downlink subframes within an acknowledgement (ACK) response window.

In Example 15, the baseband processor of Example 14 wherein optionally an ACK response is located in a physical hybrid automatic repeat request indicator channel (PHICH), wherein a PHICH resource index is defined as a function of an identifier of the UE, a starting subframe or physical resource block (PRB) index of the transmitted data.

In Example 16, the baseband processor of Example 14 wherein optionally an ACK response for the transmitted data is aggregated with other ACK responses for other transmitted data of other UEs.

In Example 17, the baseband circuitry of Example 13 can optionally when an acknowledgement (ACK) of the transmitted data is not detected or a negative ACK is detected: select, for retransmission, a second resource in a second resource pool having a fixed delay from the resource pool; transmit a second scheduling request for the selected second resource; and transmit the data in the second selected resource.

In Example 18, the baseband circuitry of Example 13 can optionally when an acknowledgement (ACK) of the scheduling request is not detected or a negative ACK is detected: perform random backoff from the resource pool; select, for retransmission, a second resource in a second resource pool satisfying the random backoff from the resource pool; transmit a second scheduling request for the selected second resource; and transmit the data in the second selected resource.

Example 19 is a computer program product comprising a computer-readable storage medium storing program code for causing one or more processors to perform a method. The method can include to acquire a downlink (DL) synchronization signal of a wireless network. The method can also include to determine resource pool information from system information data provided over the wireless network. The method can further include to randomly select an uplink (UL) resource from within a resource pool. The method can also include to transmit a scheduling request for the selected resource. When an acknowledgement (ACK) of the scheduling request is detected, the method can further include to transmit data in the selected resource.

In Example 20, the computer program product of Example 19 wherein the method can optionally include to receive an acknowledgement of the scheduling request.

In Example 21, the computer program product of Example 19 wherein the method can optionally include to determine whether the data was received by an enhanced node B (eNB).

In Example 22, the computer program product of Example 21 wherein the method can optionally include to monitor downlink subframes within an acknowledgement (ACK) response window.

In Example 23, the computer program product of Example 21 wherein optionally an acknowledgement (ACK) response for the transmitted data is aggregated with other ACK responses for other transmitted data of other user equipment (UEs).

In Example 24, the computer program product of Example 21 wherein the method can optionally include when an acknowledgement (ACK) of the transmitted data is not detected or a negative ACK is detected: to select, for retransmission, a second resource in a second resource pool having a fixed delay from the resource pool; and to transmit a second scheduling request for the selected second resource. When a second ACK of the second scheduling request is detected, the method can optionally include to transmit the data in the second selected resource.

In Example 25, the computer program product of Example 21 wherein the method can optionally include when an acknowledgement (ACK) of the scheduling request is not detected or a negative ACK is detected: to perform random backoff from the resource pool; to select, for retransmission, a second resource in a second resource pool satisfying the random backoff from the resource pool; and to transmit a second scheduling request for the selected second resource. When a second ACK of the second scheduling request is detected, the method can optionally include to transmit the data in the second selected resource.

In Example 26, the computer program product of Example 21 wherein the method can optionally include when an acknowledgement (ACK) of the scheduling request is not detected or a negative ACK is detected to retransmit the data using a configured or a pre-defined hybrid automatic repeat request (HARQ) retransmission scheme.

In Example 27, the computer program product of Example 19 wherein the method can optionally include to determine whether the scheduling request was received by an enhanced node B (eNB).

In Example 28, the computer program product of Example 27 wherein the method can optionally include to monitor downlink subframes within an acknowledgement (ACK) response window.

In Example 29, the computer program product of Example 28 wherein optionally an ACK response for the transmitted scheduling request is aggregated with other ACK responses for other transmitted scheduling requests of other UEs.

In Example 30, the computer program product of Example 27 wherein the method can optionally include when an ACK of the scheduling request is not detected or a negative ACK is detected: to select, for retransmission, a second resource in a second resource pool having a fixed delay from the resource pool; to transmit a second scheduling request for the selected second resource. When a second ACK of the second scheduling request is detected, the method can also include to transmit the data in the second selected resource.

In Example 31, the computer program product of Example 27 wherein the method can optionally include when an ACK of the scheduling request is not detected or a negative ACK is detected: to perform random backoff from the resource pool; to select, for retransmission, a second resource in a second resource pool satisfying the random backoff from the resource pool; to transmit a second scheduling request for the selected second resource. When a second ACK of the second scheduling request is detected, the method can also include to transmit the data in the second selected resource.

Example 32 is an enhanced node B (eNB) comprising a wireless interface configured to communicate over one or more radio access technologies (RATs) with a user equipment (UE) and circuitry to provide uplink transmission through the one or more RATs to the UE. The circuitry can be configured to provide a downlink (DL) synchronization signal to the UE. The circuitry can also be configured to transmit an uplink (UL) resource pool information from a System Information Block (SIB). The circuitry can be further configured to receive, through the wireless interface from the UE, data in an uplink resource from a resource pool without approval of the eNB. The circuitry can also be configured to determine whether the data was received by the eNB.

Example 33 is circuitry for a wireless mobile network base station. The circuitry can be configured to provide a synchronization signal provided over a mobile broadband network by a base station. The circuitry can also be configured to transmit data describing a set of uplink resources within the mobile broadband network of the base station. The circuitry can be further configured to receive a scheduling request for the selected resource from a user equipment (UE). The circuitry can also be configured to receive data from the UE in the selected resource to the base station without acknowledgement by the base station.

Example 34 is a computer program product comprising a computer-readable storage medium storing program code for causing one or more processors to perform a method. The method can include to provide a downlink (DL) synchronization signal of a wireless network. The method can also include to transmit resource pool information from system information data provided over the wireless network. The method can further include to receive a scheduling request for the selected resource. The method can also include to determine whether to send an acknowledgement (ACK) of the scheduling request. When an acknowledgement (ACK) of the scheduling request is sent, the method can also include receiving data in the selected resource from the UE.

Additional Examples

Additional Example 1 is a system and method of wireless communication for uplink transmission for MTC devices, comprising Mechanisms for uplink transmission, including Type 1, Type 2 and Type 3 uplink transmission; Mechanisms to support asynchronous uplink transmission; Resource pool configuration for uplink transmission; ACK response mechanism for uplink transmission; Retransmission mechanism for uplink transmission.

Additional Example 2 is a method of Additional Example 1, wherein for type 1 uplink transmission, MTC UE wakes up and first acquires the downlink (DL) synchronization signal and obtains necessary system information from System Information Block (SIBs). Wherein subsequently UE randomly selects one resource from within one sub-region or resource pool and transmits the data in the uplink on the selected resource; Wherein UE monitors the downlink subframes within an ACK response window and check whether it receives an ACK from eNB. Wherein if UE does not receive an ACK during the ACK response window, UE chooses next Kth uplink resource pool or perform random backoff on the resource pool and selects one resource to transmit the uplink data.

Additional Example 3 is a method of Additional Example 1, wherein for type 2 uplink transmission, MTC UE wakes up and first acquires the DL synchronization signal and obtains necessary system information from SIBs; Wherein MTC UE randomly selects one or a plurality of physical resources from within the data region for transmission of the UL data and one resource from within scheduling request (SR) region in resource pool and transmits the SR information on the selected resource which contains the indication of the one or a plurality of resources selected for data transmission; Wherein MTC UE transmits the uplink data on the resource within the data region which is indicated in the SR information; Wherein the UE monitors the downlink subframes within an ACK response window and check whether it receives an ACK from eNB. Wherein, if the UE does not receive an ACK during the ACK response window, the UE chooses next K^th uplink resource pool or performs random backoff on the resource pool and selects one resource to transmit the uplink data.

Additional Example 4 is a method of Additional Example 1, wherein for type 3 uplink transmission, MTC UE wakes up and first acquires the DL synchronization signal and obtains necessary system information from SIBs; Wherein the UE randomly selects one or a plurality of physical resources from within the data region for transmission of the UL data and one resource from within scheduling request (SR) region in resource pool and transmits the SR information on the selected resource which contains the indication of at least the one or a plurality of resources selected for data transmission, and possibly also the MCS to be used for the data transmission; Wherein the UE monitors the downlink subframes within an ACK response window corresponding to the SR transmission to receive at least confirmation from the eNodeB on whether the UE should transmit on the selected resources or not, and possibly also including one or more of: the value of timing advance (TA) and transmit power control (TPC) adjustment to be used for the data transmission, alternate resources for data transmission, and alternate MCS level to be used for data transmission; Wherein, if the UE does not receive an ACK during the ACK response window corresponding to SR transmission, the UE chooses the next K^th uplink resource pool or performs random backoff on the resource pool and selects resources to transmit the SR and the subsequent uplink data. Wherein, if the UE receives an ACK during the ACK response window corresponding to the SR transmission, the UE transmits the uplink data on the resource within the data region based on the ACK feedback received from the eNodeB in response to the SR transmission; Wherein the UE monitors the downlink subframes within an ACK response window and check whether it receives an ACK from eNB; Wherein, if the UE does not receive an ACK or receives a Negative ACKnowledgment (NACK) during the ACK response window corresponding to UL data transmission, the UE re-transmits the data packets following the configured or pre-defined Hybrid ARQ (HARM) retransmission scheme, or the UE chooses the next Kth uplink resource pool or performs random backoff on the resource pool and selects resources to transmit the SR and the subsequent uplink data.

Additional Example 5 is a method of Additional Example 1, wherein a long CP length is defined within the uplink transmission resource pool. Wherein MTC UE follows the downlink synchronization timing when transmitting the data in the uplink; Wherein long CP is configured by higher layers, via Master Information Block (MIB), SIB or UE specific dedicated RRC signaling.

Additional Example 6 is a method of Additional Example 1, wherein UE applies timing advance based on the TA value obtained from the initial uplink synchronization.

Additional Example 7 is a method of Additional Example 1, wherein the configuration of this resource pool for uplink transmission is predefined or provided by the higher layers via MIB or SIB or UE specific dedicated RRC signaling.

Additional Example 8 is a method of Additional Example 7, wherein the configuration contains at least periodicity and/or subframe offset for this resource pool. Wherein a subframe bit map with parameter "subframeBitMap" are used to signal the allocated subframe; Wherein the first subframe of the N_(UL-CL) downlink subframes of the uplink transmission resource pool, shall satisfy $(10 \times n_f + \lfloor n_s/2 \rfloor - \Delta_{UL-CL}) \bmod T_{UL-CL} = 0$ where $n_f$ and $n_s$ are radio frame number and slot number.

Additional Example 9 is a method of Additional Example 7, wherein the starting PRB with parameter "startPRB" and the size of MTC resource pool "lengthPRB" are used to indicate the frequency information of the resource pool.

Additional Example 10 is a method of Additional Example 7, wherein two non-overlapping frequency locations is allocated for the uplink transmission resource pool.

Additional Example 11 is a method of Additional Example 7, wherein for Type-2 and Type-3 uplink transmission, the resource pool is further divided into SR region and data region for uplink transmission.

Additional Example 12 is a method of Additional Example 1, wherein ACK feedback for uplink data transmission for Types 1, 2, and 3 UL transmission schemes, or ACK feedback for SR transmission for Type 3 UL transmission scheme, is UE specific or is transmitted in a group manner; Wherein the position of the ACK response window is predefined or configured by higher layer via MIB, SIB or UE specific RRC signaling.

Additional Example 13 is a method of Additional Example 12, wherein PHICH is used to carry ACK feedback in a UE specific manner. Wherein PHICH resource index is defined as a function of UE ID, the starting subframe and/or PRB index wherein MTC UE transmits the uplink data.

Additional Example 14 is a method of Additional Example 12, wherein PDCCH is used to carry ACK feedback in a UE specific manner. Wherein a new Connection-Less-RNTI (CL-RNTI) is defined as a function of the UE ID, and starting PRB and subframe wherein MTC UE transmits the uplink data. Wherein UE ID is included in the DCI format in PDCCH transmission for contention resolution.

Additional Example 15 is a method of Additional Example 12, wherein 5G downlink control channel (e.g. PDCCH or PDCCH like) and 5G downlink data or shared channel (e.g. PDSCH or PDSCH-like) are used to carry ACK feedback in a group manner.

Wherein eNB can aggregate multiple ACK response messages and transmit in one downlink data or shared channel (e.g. PDSCH). Wherein UE ID and the resource information (resource ID) in the time and frequency domain within the resource pool wherein MTC UE transmits the uplink data are included in the ACK response message. Wherein a new RNTI (CL_RNTI) is defined as a function of the starting PRB and for the resource pool.

Additional Example 16 is a method of Additional Example 12, wherein for Type-3 uplink transmission, resource from the data region is included in the ACK response message. Wherein the amount of timing advance (TA) that the UE applies to the DL reference time for the transmission of the data packet is also indicated in this ACK response.

Additional Example 17 is a method of Additional Example 1, wherein if MTC UE does not receive the ACK response from eNB within the ACK response window, it waits until next opportunity for uplink data transmission by a fixed delay or random backoff on the resource pool.

Additional Example 18 is a method of Additional Example 17, wherein a fixed delay K on the resource pool is considered, Wherein K is predefined in the specification or configured by the higher layers via MIB, SIB or UE specific dedicated RRC signaling.

Additional Example 19 is a method of Additional Example 17, wherein MTC UE randomly choose one value K within a window [0, W−1], wherein window size W is predefined or configured by the higher layers via MIB, SIB or UE specific dedicated RRC signaling. Wherein W is fixed or increased for each retransmission.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A computer program product comprising a non-transitory computer-readable storage medium storing program code for causing one or more processors to perform a method, the method comprising:
   acquire a downlink (DL) synchronization signal of a wireless network;
   determine resource pool information from system information data provided over the wireless network;
   randomly select an uplink (UL) resource from within a resource pool;
   transmit a scheduling request for the randomly selected resource; and
   when an acknowledgement (ACK) of the scheduling request is detected:
      transmit data in the randomly selected resource without approval of the scheduling request by the wireless network.

2. The computer program product of claim 1, wherein the method further comprises to determine whether the data was received by an enhanced node B (eNB).

3. The computer program product of claim 2, wherein to determine whether the data was received by the eNB further comprises:
   when an acknowledgement (ACK) of the transmitted data is not detected or a negative ACK is detected:

select, for retransmission, a second resource in a second resource pool having a fixed delay from the resource pool;
transmit a second scheduling request for the selected second resource; and
when a second ACK of the second scheduling request is detected:
transmit the data in the second selected resource.

4. The computer program product of claim 2, wherein to determine whether the data was received by the eNB further comprises:
when an acknowledgement (ACK) of the scheduling request is not detected or a negative ACK is detected:
perform random backoff from the resource pool;
select, for retransmission, a second resource in a second resource pool satisfying the random backoff from the resource pool;
transmit a second scheduling request for the selected second resource; and
when a second ACK of the second scheduling request is detected:
transmit the data in the second selected resource.

5. The computer program product of claim 2, wherein to determine whether the data was received by the eNB further comprises:
when an acknowledgement (ACK) of the scheduling request is not detected or a negative ACK is detected:
retransmit the data using a configured or a pre-defined hybrid automatic repeat request (HARD) retransmission scheme.

6. The computer program product of claim 1, wherein the method further comprises to determine whether the scheduling request was received by an enhanced node B (eNB).

7. The computer program product of claim 6, wherein to determine whether the scheduling request was received by the eNB further comprises to monitor downlink subframes within an acknowledgement (ACK) response window.

8. The computer program product of claim 7, wherein an ACK response for the transmitted scheduling request is aggregated with other ACK responses for other transmitted scheduling requests of other UEs using physical downlink control channel (PDCCH).

9. The computer program product of claim 6, wherein the method further comprises when an ACK of the scheduling request is not detected or a negative ACK is detected:
select, for retransmission, a second resource in a second resource pool having a fixed delay from the resource pool;
transmit a second scheduling request for the selected second resource; and
when a second ACK of the second scheduling request is detected:
transmit the data in the second selected resource.

10. The computer program product of claim 6, wherein the method further comprises when an ACK of the scheduling request is not detected or a negative ACK is detected:
perform random backoff from the resource pool;
select, for retransmission, a second resource in a second resource pool satisfying the random backoff from the resource pool;
transmit a second scheduling request for the selected second resource; and
when a second ACK of the second scheduling request is detected:
transmit the data in the second selected resource.

11. A user equipment (UE) comprising:
a wireless interface configured to communicate over one or more radio access technologies (RATs) with an enhanced node B (eNB); and
a processor to provide uplink transmission through the one or more RATs to the eNB, the a processor configured to:
acquire a downlink (DL) synchronization signal from the eNB;
obtain an uplink (UL) resource pool information from a System Information Block (SIB) transmitted by the eNB;
transmit, through the wireless interface, data in a selected uplink resource from a resource pool to the eNB without approval of the eNB; and
determine whether the data was received by the eNB.

12. The UE of claim 11, wherein to transmit data in a selected uplink resource further comprises to transmit data in a randomly selected uplink resource in the resource pool.

13. The UE of claim 11, wherein to determine whether the data was received by the eNB further comprises to monitor DL subframes within an acknowledgement (ACK) response window.

14. The UE of claim 13, wherein the processor further comprises baseband processing circuitry configured to determine an ACK response for the transmitted data that is aggregated with other ACK responses for other transmitted data of other UEs.

15. The UE of claim 11, wherein a radio network temporary identifier (RNTI) is defined as a function of an identifier of the UE, a starting physical resource block (PRB) and subframe of the transmitted data.

16. A baseband processor for a user equipment (UE) comprising:
baseband circuitry configured to:
receive a synchronization signal provided over a mobile broadband network by a base station;
determine a set of uplink resources within the mobile broadband network of the base station;
randomly select a resource from within the set of uplink resources, wherein the set of uplink resources is divided into a scheduling request region and a data region for uplink transmission;
transmit a scheduling request for the randomly selected resource to the base station; and
transmit data in the randomly selected resource to the base station.

17. The baseband processor of claim 16, wherein a configuration defining the uplink resources is predefined, provided by the higher layers via master information block (MIB), system information block (SIB) or UE specific dedicated radio resource control (RRC) signaling.

18. The baseband processor of claim 16, wherein to transmit data in the randomly selected uplink resource further comprises to transmit data in the randomly selected uplink resource without approval of the scheduling request by the base station.

19. The baseband processor of claim 16, wherein the circuitry is further configured to determine whether the data was received by an enhanced node B (eNB).

20. The baseband processor of claim 19, wherein to determine whether the data was received by the eNB further comprises to monitor downlink subframes within an acknowledgement (ACK) response window.

21. The baseband processor of claim 20, wherein an ACK response is located in a physical hybrid automatic repeat request indicator channel (PHICH), wherein a PHICH resource index is defined as a function of an identifier of the UE, a starting subframe or physical resource block (PRB) index of the transmitted data.

22. The baseband processor of claim 20, wherein an ACK response for the transmitted data is aggregated with other ACK responses for other transmitted data of other UEs using physical downlink control channel (PDCCH).

23. The baseband processor of claim 19, wherein to determine whether the data was received by the eNB further comprises:
when an acknowledgement (ACK) of the transmitted data is not detected or a negative ACK is detected:
select, for retransmission, a second resource in a second resource pool having a fixed delay from the resource pool;
transmit a second scheduling request for the selected second resource; and
transmit the data in the second selected resource.

24. The baseband processor of claim 19, wherein to determine whether the data was received by the eNB further comprises:
when an acknowledgement (ACK) of the scheduling request is not detected or a negative ACK is detected:
perform random backoff from the resource pool;
select, for retransmission, a second resource in a second resource pool satisfying the random backoff from the resource pool;
transmit a second scheduling request for the selected second resource; and
transmit the data in the second selected resource.

* * * * *